United States Patent [19]

Hillis et al.

[11] Patent Number: 4,984,235
[45] Date of Patent: Jan. 8, 1991

[54] METHOD AND APPARATUS FOR ROUTING MESSAGE PACKETS AND RECORDING THE ROOFING SEQUENCE

[75] Inventors: W. Daniel Hillis, Brookline; Brewster Kahle, Somerville; George G. Robertson, Marblehead; Guy L. Steele, Jr., Lexington, all of Mass.

[73] Assignee: Thinking Machines Corporation, Cambridge, Mass.

[21] Appl. No.: 43,126

[22] Filed: Apr. 27, 1987

[51] Int. Cl.[5] .............................................. H04J 3/26
[52] U.S. Cl. .................................... 370/60; 370/94.1
[58] Field of Search ...................... 370/58, 60, 54, 94; 340/825.52, 825.53

[56] References Cited

U.S. PATENT DOCUMENTS

| | | | |
|---|---|---|---|
| 4,399,531 | 8/1983 | Grande et al. | 370/60 |
| 4,550,402 | 10/1985 | Gable et al. | 370/60 |
| 4,581,735 | 4/1986 | Flamm et al. | 370/60 |
| 4,598,400 | 7/1986 | Hillis | 370/60 |
| 4,603,235 | 7/1986 | Crabbe, Jr. | 370/58 |
| 4,630,258 | 12/1986 | McMillen et al. | 370/94 |

Primary Examiner—M. H. Paschall
Attorney, Agent, or Firm—Pennie & Edmonds

[57] ABSTRACT

A message packet router is described that performs the functions of determining if a message packet is addressed to circuitry associated with the router, of routing message packets to their distination if possible and of storing message packets that cannot be routed on because of circuit conflicts. The router also provides additional functions of merging message packets addressed to the same destination, of saving the state of the router at each significant point in the message routing cycle, and of running the entire routing cycle backwards. This later feature makes it possible to broadcast message packets selectively to certain processors in the array.

19 Claims, 18 Drawing Sheets

FIG. 12A

CYCLE=0

| 0 | 1 | 2 | 3 | 4 | 5 | 6 | 7 | 8 | 9 | 10 | 11 |
|---|---|---|---|---|---|---|---|---|---|---|---|
| msgp | dn | dn-2 | | | | | | | | | dn-22 |
| par | dn-1 | | | | | | | | | | dn-21 |

CYCLE=1

| 0 | 1 | 2 | 3 | 4 | 5 | 6 | 7 | 8 | 9 | 10 | 11 |
|---|---|---|---|---|---|---|---|---|---|---|---|
| a0 | par | dn-1 | | | | | | | | | dn-21 |
| msgp | dn | dn-2 | | | | | | | | | dn-20 |

CYCLE=2

| 0 | 1 | 2 | 3 | 4 | 5 | 6 | 7 | 8 | 9 | 10 | 11 |
|---|---|---|---|---|---|---|---|---|---|---|---|
| a1 | msgp | dn | dn-2 | | | | | | | | dn-20 |
| a0 | par | dn-1 | | | | | | | | | dn-19 |

CYCLE=3

| 0 | 1 | 2 | 3 | 4 | 5 | 6 | 7 | 8 | 9 | 10 | 11 |
|---|---|---|---|---|---|---|---|---|---|---|---|
| a2 | a1 | par | dn-1 | | | | | | | | dn-19 |
| a0 | msgp | gn | dn-2 | | | | | | | | dn-18 |

CYCLE=4

| 0 | 1 | 2 | 3 | 4 | 5 | 6 | 7 | 8 | 9 | 10 | 11 |
|---|---|---|---|---|---|---|---|---|---|---|---|
| a3 | a2 | msgp | dn | dn-2 | | | | | | | dn-18 |
| a0 | a1 | par | dn-1 | | | | | | | | dn-17 |

CYCLE=5

| 0 | 1 | 2 | 3 | 4 | 5 | 6 | 7 | 8 | 9 | 10 | 11 |
|---|---|---|---|---|---|---|---|---|---|---|---|
| a4 | a3 | a2 | par | dn-1 | | | | | | | dn-17 |
| a0 | a1 | msgp | dn | dn-2 | | | | | | | dn-16 |

CYCLE=6

| 0 | 1 | 2 | 3 | 4 | 5 | 6 | 7 | 8 | 9 | 10 | 11 |
|---|---|---|---|---|---|---|---|---|---|---|---|
| a5 | a4 | a3 | msgp | dn | dn-2 | | | | | | dn-16 |
| a0* | a1 | a2 | par | dn-1 | | | | | | | dn-15 |

CYCLE=7

| 0 | 1 | 2 | 3 | 4 | 5 | 6 | 7 | 8 | 9 | 10 | 11 |
|---|---|---|---|---|---|---|---|---|---|---|---|
| a6 | a5 | a4 | a3 | par | dn-1 | | | | | | dn-15 |
| a0 | a1 | a2 | msgp | dn | dn-2 | | | | | | dn-14 |

CYCLE=13

| 0 | 1 | 2 | 3 | 4 | 5 | 6 | 7 | 8 | 9 | 10 | 11 |
|---|---|---|---|---|---|---|---|---|---|---|---|
| x0 | a11 | a10 | a9 | a8 | a7 | a6 | par | dn-1 | | | dn-9 |
| a0 | a1 | a2 | a3 | a4 | a5 | msgp | dn | dn-2 | | | dn-8 |

CYCLE=14

| 0 | 1 | 2 | 3 | 4 | 5 | 6 | 7 | 8 | 9 | 10 | 11 |
|---|---|---|---|---|---|---|---|---|---|---|---|
| x1 | a0 | a11 | a10 | a9 | a8 | a7 | msgp | dn | dn-2 | | dn-8 |
| x0 | a1 | a2 | a3 | a4 | a5 | a6 | par | dn-1 | | | dn-7 |

CYCLE=15

| 0 | 1 | 2 | 3 | 4 | 5 | 6 | 7 | 8 | 9 | 10 | 11 |
|---|---|---|---|---|---|---|---|---|---|---|---|
| x2 | x0 | a0 | a11 | a10 | a9 | a8 | a7 | par | dn-1 | | dn-7 |
| x1 | a1 | a2 | a3 | a4 | a5 | a6 | msgp | dn | dn-2 | | dn-6 |

FIG. 12B

| CYCLE=16 | 0 | 1 | 2 | 3 | 4 | 5 | 6 | 7 | 8 | 9 | 10 | 11 | |
|---|---|---|---|---|---|---|---|---|---|---|---|---|---|
| | x3 | x1 | a1 | a0 | a11 | a10 | a9 | a8 | msgp | dn | dn-2 | | dn-6 |
| | x2 | x0 | a2 | a3 | a4 | a5 | a6 | a7 | par | dn-1 | | dn-5 | |

| CYCLE=17 | 0 | 1 | 2 | 3 | 4 | 5 | 6 | 7 | 8 | 9 | 10 | 11 | |
|---|---|---|---|---|---|---|---|---|---|---|---|---|---|
| | x4 | x2 | x0 | a1 | a0 | a11 | a10 | a9 | a8 | par | dn-1 | | dn-5 |
| | x3 | x1 | a2 | a3 | a4 | a5 | a6 | a7 | msgp | dn | dn-2 | dn-4 | |

| CYCLE=18 | 0 | 1 | 2 | 3 | 4 | 5 | 6 | 7 | 8 | 9 | 10 | 11 | |
|---|---|---|---|---|---|---|---|---|---|---|---|---|---|
| | x5 | x3 | x1 | a2 | a1 | a0 | a11 | a10 | a9 | msgp | dn | dn-2 | dn-4 |
| | x4 | x2 | x0 | a3 | a4 | a5 | a6 | a7 | a8 | par | dn-1 | dn-3 | |

| CYCLE=23 x11→ | 0 | 1 | 2 | 3 | 4 | 5 | 6 | 7 | 8 | 9 | 10 | 11 | |
|---|---|---|---|---|---|---|---|---|---|---|---|---|---|
| | x10 | | | | x4 | x2 | x0 | a4 | a3 | a2 | a1 | a0 | a11 | par |
| | | | | | x3 | x1 | a5 | a6 | a7 | a8 | a9 | a10 | msgp |

| CYCLE=24 x12→ | 0 | 1 | 2 | 3 | 4 | 5 | 6 | 7 | 8 | 9 | 10 | 11 | |
|---|---|---|---|---|---|---|---|---|---|---|---|---|---|
| | x11 | | | | x3 | x1 | a5 | a4 | a3 | a2 | a1 | a0 | msgp |
| | | | | x4 | x2 | x0 | a6 | a7 | a8 | a9 | a10 | a11 | |

| CYCLE=25 x13→ | 0 | 1 | 2 | 3 | 4 | 5 | 6 | 7 | 8 | 9 | 10 | 11 | |
|---|---|---|---|---|---|---|---|---|---|---|---|---|---|
| | x12 | | | | x4 | x2 | x0 | | a4 | a3 | a2 | a1 | a0 |
| | | | | | x3 | x1 | a6 | a7 | a8 | a9 | a10 | a11 | |

| CYCLE=26 x14→ | 0 | 1 | 2 | 3 | 4 | 5 | 6 | 7 | 8 | 9 | 10 | 11 | |
|---|---|---|---|---|---|---|---|---|---|---|---|---|---|
| | x13 | | | | | x3 | x1 | a6 | a5 | a4 | a3 | a2 | a1 |
| | | | | | x4 | x2 | x0 | a7 | a8 | a9 | a10 | a11 | |

| CYCLE=27 x15→ | 0 | 1 | 2 | 3 | 4 | 5 | 6 | 7 | 8 | 9 | 10 | 11 | |
|---|---|---|---|---|---|---|---|---|---|---|---|---|---|
| | x14 | | | | | x4 | x2 | x0 | a6 | a5 | a4 | a3 | a2 |
| | | | | | | x3 | x1 | a7 | a8 | a9 | a10 | a11 | |

| CYCLE=28 x16→ | 0 | 1 | 2 | 3 | 4 | 5 | 6 | 7 | 8 | 9 | 10 | 11 | |
|---|---|---|---|---|---|---|---|---|---|---|---|---|---|
| | x15 | | | | | x3 | x1 | a7 | a6 | a5 | a4 | a3 |
| | | | | | x4 | x2 | x0 | a8 | a9 | a10 | a11 | | |

| CYCLE=35 x23→ | 0 | 1 | 2 | 3 | 4 | 5 | 6 | 7 | 8 | 9 | 10 | 11 | |
|---|---|---|---|---|---|---|---|---|---|---|---|---|---|
| | x22 | | | | | | | | | x4 | x2 | x0 | a10 |
| | | | | | | | | | | x3 | x1 | a11 | |

| CYCLE=36 x24→ | 0 | 1 | 2 | 3 | 4 | 5 | 6 | 7 | 8 | 9 | 10 | 11 | |
|---|---|---|---|---|---|---|---|---|---|---|---|---|---|
| | x23 | | | | | | | | | a5 | x3 | x1 | a11 |
| | | | | | | | | | | x4 | x2 | x0 | |

| CYCLE=37 x25→ | 0 | 1 | 2 | 3 | 4 | 5 | 6 | 7 | 8 | 9 | 10 | 11 | |
|---|---|---|---|---|---|---|---|---|---|---|---|---|---|
| | x24 | | | | | | | | | a6 | x4 | x2 | x0 |
| | | | | | | | | | | a5 | x3 | x1 | |

672
674

METHOD AND APPARATUS FOR ROUTING MESSAGE PACKETS AND RECORDING THE ROOFING SEQUENCE

CROSS REFERENCE TO RELATED APPLICATIONS

Related applications are "Parallel Processor", Ser. No. 499,474 now U.S. Pat. No. 4,814,973 and "Parallel Processor/Memory Circuit", Ser. No. 499,471 now U.S. Pat. No. 4,709,327, both filed May 31, 1983, "Method and Apparatus for Routing Message Packets", Ser. No. 671,835, filed Nov. 15, 1984, now U.S. Pat. No. 4,598,400, "Method and Apparatus for Interconnecting Processors in a Hyper-Dimensional Array", Ser. No. 740,943 now U.S. Pat. No. 4,805,091, filed May 31, 1985, "Very Large Scale Computer", Ser. No. 902,290 now abandoned, filed Aug. 29, 1986, and "Massively Parallel Processor", Ser. No. 924,090 now abandoned, filed Oct. 28, 1986.

BACKGROUND OF THE INVENTION

This relates to a method and apparatus for routing message packets and, in particular, to a method and apparatus especially suited to routing message packets in massively parallel processors such as those disclosed in the above-referenced '471 and '474 applications and the '400 patent.

As shown in FIG. 1A of the '400 patent which is reproduced in FIG. 1, the computer system of those applications comprises a mainframe computer 10, a microcontroller 20, an array 30 of parallel processing integrated circuits 35, a data source 40, a first buffer and multiplexer/demultiplexer 50, first, second, third and fourth bidirectional bus control circuits 60, 65, 70, 75, a second buffer and multiplexer/demultiplexer 80, and a data sink 90. Mainframe computer 10 may be a suitably programmed commercially available general purpose computer such as a VAX (TM) computer manufactured by Digital Equipment Corp. Microcontroller 20 is an instruction sequencer of conventional design for generating a sequence of instructions that are applied to array 30 by means of a thirty-two bit parallel bus 22. Microcontroller 20 receives from array 30 a signal on line 26. This signal is a general purpose or GLOBAL signal that can be used for data output and status information. Bus 22 and line 26 are connected in parallel to each IC 35. As a result, signals from microcontroller 20 are applied simultaneously to each IC 35 in array 30 and the signal applied to microcontroller 20 on line 26 is formed by combining the signal outputs from all of ICs 35 of the array.

Array 30 contains thousands of identical ICs 35; and each IC 35 contains several identical processor/memories 36. In the embodiment disclosed in the '400 patent, it is indicated that the array may contain up to 32,768 ($=2^{15}$) identical ICs 35; and each IC 35 may contain 32 ($=2^5$) identical processor/memories 36. At the time of filing of this application for patent, arrays containing up to 4096 ($=2^{12}$) identical ICs 35 containing 16 ($=2^4$) identical processor/memories each have been manufactured and shipped by the assignee as Connection Machine (Reg. TM) computers.

Processor/memories 36 of the '400 patent are organized and interconnected in two geometries. One geometry is a conventional two-dimensional grid pattern in which the processor/memories are organized in a rectangular array and connected to their four nearest neighbors in the array. For convenience, the sides of this array are identified as NORTH, EAST, SOUTH and WEST. To connect each processor/memory to its four nearest neighbors, the individual processor/memories are connected by electrical conductors between adjacent processor/memories in each row and each column of the grid.

The second geometry is that of a Boolean n-cube. To understand the n-cube connection pattern, it is helpful to number the ICs from 0 to 32,767 (in the case of a cube of fifteen dimensions) and to express these numbers or addresses in binary notation using fifteen binary digits. Just as we can specify the position of an object in a two dimensional grid by using two numbers, one of which specifies its position in the first dimension of the two-dimensional grid and the other which specifies it position in the second dimension, so too we can use a number to identify the position of an IC in each of the fifteen dimensions of the Boolean 15-cube. In an n-cube, however, an IC can have one of only two different positions, 0 and 1, in each dimension. Thus, the fifteen-digit IC address in binary notation can be and is used to specify the IC's position in the fifteen dimensions of the n-cube. Moreover, because a binary digit can have only two values, zero or one, and because each IC is identified uniquely by fifteen binary digits, each IC has fifteen other ICs whose binary address differs by only one digit from its own address. We will refer to these fifteen ICs whose binary address differs by only one from that of a first IC as the first IC's nearest neighbors. Those familiar with the mathematical definition of a Hamming distance will recognize that the first IC is separated from each of its fifteen nearest neighbors by the Hamming distance one.

To connect ICs 35 of the above-referenced applications in the form of a Boolean 15-cube, each IC is connected to its fifteen nearest neighbors by 15 input lines 38 and fifteen output lines 39. Each of these fifteen input lines 38 to each IC 35 is associated with a different one of the fifteen dimensions of the Boolean 15-cube and likewise each of the fifteen output lines 39 from each IC 35 is associated with a different dimension. Specific details of the connection wiring for the Boolean n-cube are set forth in the '943 application referenced above.

To permit communication through the interconnection pattern of the Boolean 15-cube, the results of computations are organized in the form of message packets; and these packets are routed from one IC to the next by routing circuitry in each IC in accordance with address information that is part of the packet.

Each IC 35 contains a plurality of processor/memories that are disclosed in greater detail in FIG. 7A of the '400 patent and in FIGS. 4 and 6 of '090 application for "Massively Parallel Processor". As shown in FIG. 7A, processor/memory 36 comprises a random access memory (RAM) 250, an arithmetic logic unit (ALU) 280 and a flag controller 290. The inputs to RAM 250 include a message packet input line 122 from a communication interface unit (CIU) 180 of FIG. 6B of the '400 patent; and the outputs from RAM 250 are lines 256, 257 to ALU 280. The ALU operates on data from three sources, two registers in the RAM and one flag input, and produces two outputs, a sum output on line 285 that is written into one of the RAM registers and a carry output on line 287 that is made available to certain registers in the flag controller and can be supplied to communications interface unit 180 via message packet output line 123.

An alternative design for the processor/memory is disclosed in the '090 application for "Massively Parallel Processor" As shown in FIGS. 4 and 6 thereof, the processors and memories are located in separate integrated circuits 334, 340 mounted on the same circuit board. In particular, each integrated circuit 334 comprises sixteen identical processors 336, a control unit 337, a router 338 and a memory interface 339. The memory interface connects the sixteen processors of an integrated circuit 334 to their memories which, illustratively, are located on sixteen separate integrated circuits 340. The router 338 connects the sixteen processors to twelve nearest neighbor routers connected in a twelve dimension hypercube.

Each integrated circuit 35 also includes certain supervisory circuitry for the processor/memories on the IC and a routing circuit for connecting the IC to its nearest neighbor ICs in the Boolean n-cube. As disclosed in FIG. 6B of the '400 patent which is reproduced in FIG. 2, the supervisory circuitry comprises a timing generator 140, a programmable logic array 150 for decoding instructions received from microcontroller 20 and providing decoded instructions to the processor/memories of the IC, and a communications interface 180 which controls the flow of outgoing and incoming message packets between the processor/memories of an IC and routing circuit associated 200 with that IC.

Routing circuit 200 controls the routing of message packets to and from nearest neighbor ICs in the Boolean n-cube. It comprises a line assigner 205, a message detector 210, a buffer and address restorer 215 and a message injector 220 connected serially in this order in a loop so that the output of one element is provided to the input of the next and the output of message injector 220 is provided to line assigner 205.

Line assigner 205 analyzes the addresses of message packets received on incoming lines 38 to determine whether they are directed to this particular IC or some other IC; it routes the message packets toward their destination if possible; and it stores any message packet destined for this IC as well as any message packet that cannot be routed on because of a conflict in circuit allocation. Line assigner 205 comprises a fifteen by fifteen array of substantially identical routing logic cells 400. Each column of this array controls the flow of message packets between a nearest neighbor routing circuit 200 in one dimension of the Boolean 15-cube. Each row of this array controls the storage of one message packet in routing circuit 200.

Message detector 210 checks for the receipt of message packets, examines the address of the message packets received on lines 207 from line assigner 205 and supplies those message packets addressed to this IC to communications interface 180. Buffer and address restorer 215 comprise a tapped shift register. The output of the buffer and address restorer is applied to the message injector 220. Message injector 220 injects a single message packet at a time from communications interface 180 into the group of message packets circulating through the routing circuit.

Signals from the routing circuit are applied to CIU 180 on lines 197, 198 and 199. These signal lines provide, respectively, an indication whether an incoming message packet is available from the routing circuit, the incoming message packet itself and an indication whether the outgoing message packet on line 196 was successfully received by the routing circuit. A signal on line 194 indicates when a message packet is available for routing and the message packet itself is provided on line 196.

If no routing conflicts are encountered, a message packet will be routed from an input to a routing cell of the first dimension to the register in the processor/memory to which it is addressed during one message cycle. If there are routing conflicts, the message packet will be temporarily stored in the processing and storage means of a routing circuit at one or more intermediate points; and more than one routing cycle will be required to route the message packet to its destination.

SUMMARY OF THE INVENTION

The present invention is directed to an improved routing circuit for routing addressed message packets to a destination specified by the packet. The invention is particularly useful in routing message packets in a massively parallel computer and will be described in that context.

The router of an IC of the present invention provides the same functions described in the '400 patent of determining if a message packet is addressed to that particular IC, of routing message packets to their destination if possible and of storing message packets addressed to that IC as well as any message packet that cannot be routed on because of circuit conflicts.

It also provides additional functions of merging message packets addressed to the same destination, of saving the state of the router at each significant point in the message routing cycle, and of running the entire routing cycle backwards. This later feature makes it possible to broadcast message packets selectively to certain processors in the array.

Illustrative apparatus of the present invention comprises a memory for storing message packets enroute from a source processor to a destination processor, means for selectively connecting a message packet to a communication line that is connected to a node between said source and said destination processors, means for selectively inserting into a queue at a source processor a message packet addressed for routing to a destination processor, means for selectively removing from said memory at a destination processor a message packet addressed to said destination processor, means for recording operating states of said means for selectively connecting, said means for selectively inserting and said means for selectively removing at successive stages of their operation in the process of routing the message packet from a first processor to a second processor, and means for reestablishing said operating states of said means for selectively connecting, said means for selectively inserting, and said means for selectively removing in a sequence that is the reverse of that used to route the message packet from the first processor to the second processor, whereby a message packet can be routed from said second processor back to said first processor.

BRIEF DESCRIPTION OF DRAWINGS

These and other objects, features and advantages of the invention will be more readily apparent from the following description of a preferred embodiment of the invention in which:

FIG. 12A and 12B are schematic illustrations depicting the contents of latches 692, 694 as a message packet is shifted through them;

DETAILED DESCRIPTION OF PREFERRED EMBODIMENT

The present invention is implemented in a single instruction multiple data (SIMD) parallel computer which, illustratively, comprises an array of 65,536 ($=2^{16}$) processors mounted on 128 circuit boards. Preferably, these processors are organized into four units each under control of a microcontroller and each of these units can be connected to one of four host computers as set forth in greater detail in the above-referenced '090 application. At least within each unit of the computer, the processors of that unit are operated in parallel so that the same instruction is executed simultaneously by each processor on the data available to it. Because the data are different, the results of execution may be different at different processors and, indeed complete execution of the instruction may even be inhibited.

Figure 1:
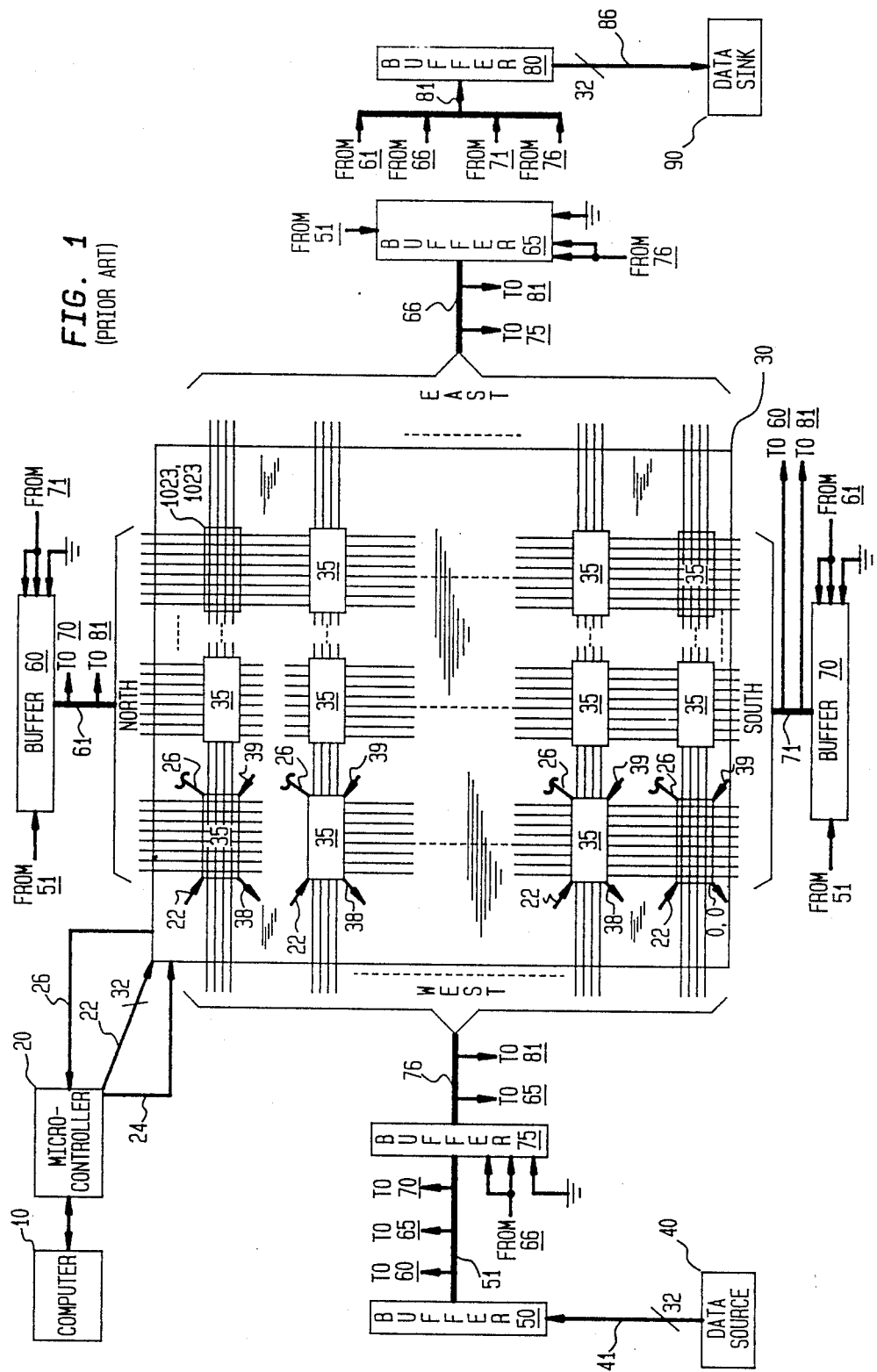
FIG. 1 is a schematic illustration of a massively parallel processor in which the invention may be used.
Figure 2:
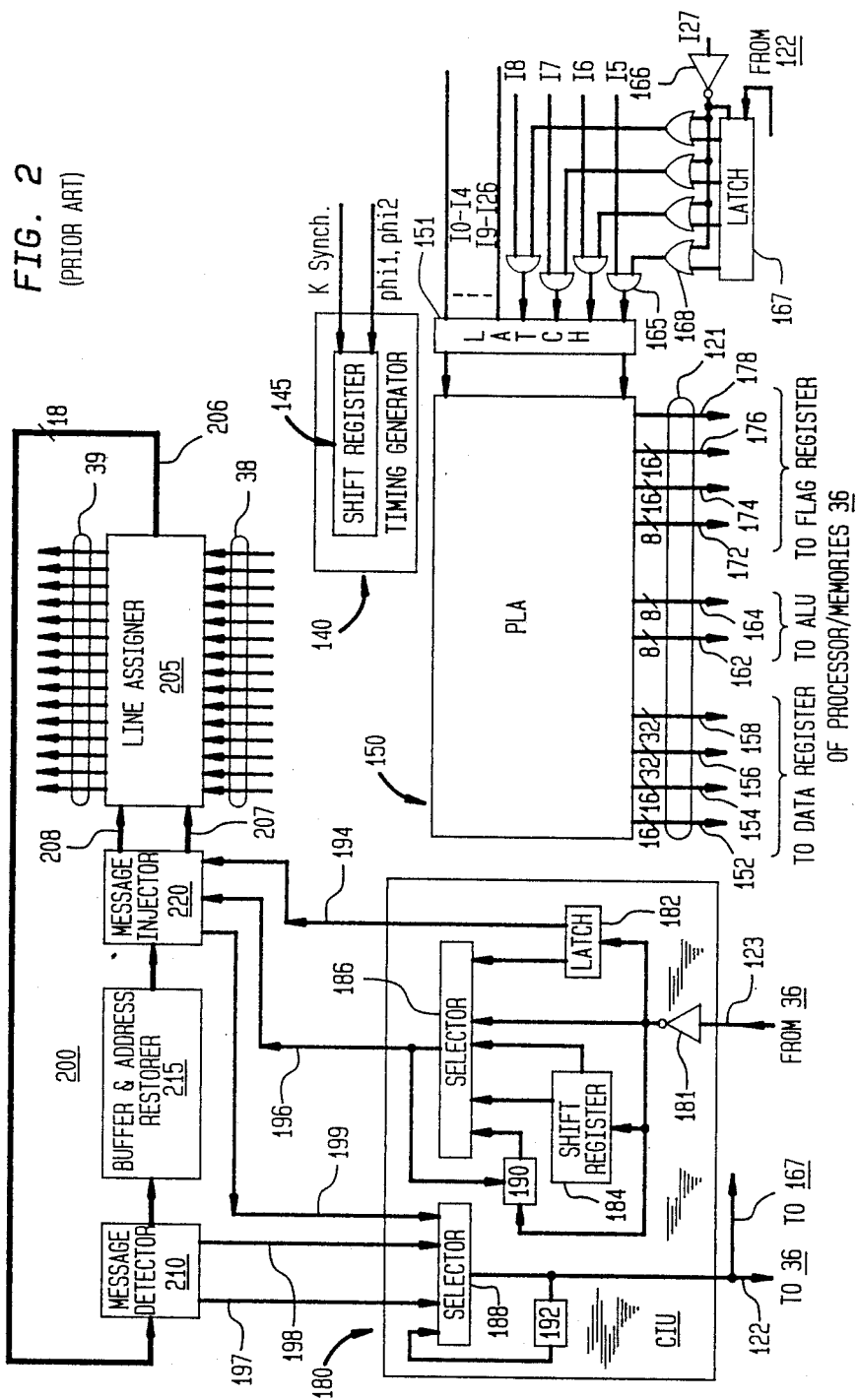
FIG. 2 is a schematic illustration of a prior art routing circuit.
Figure 3:
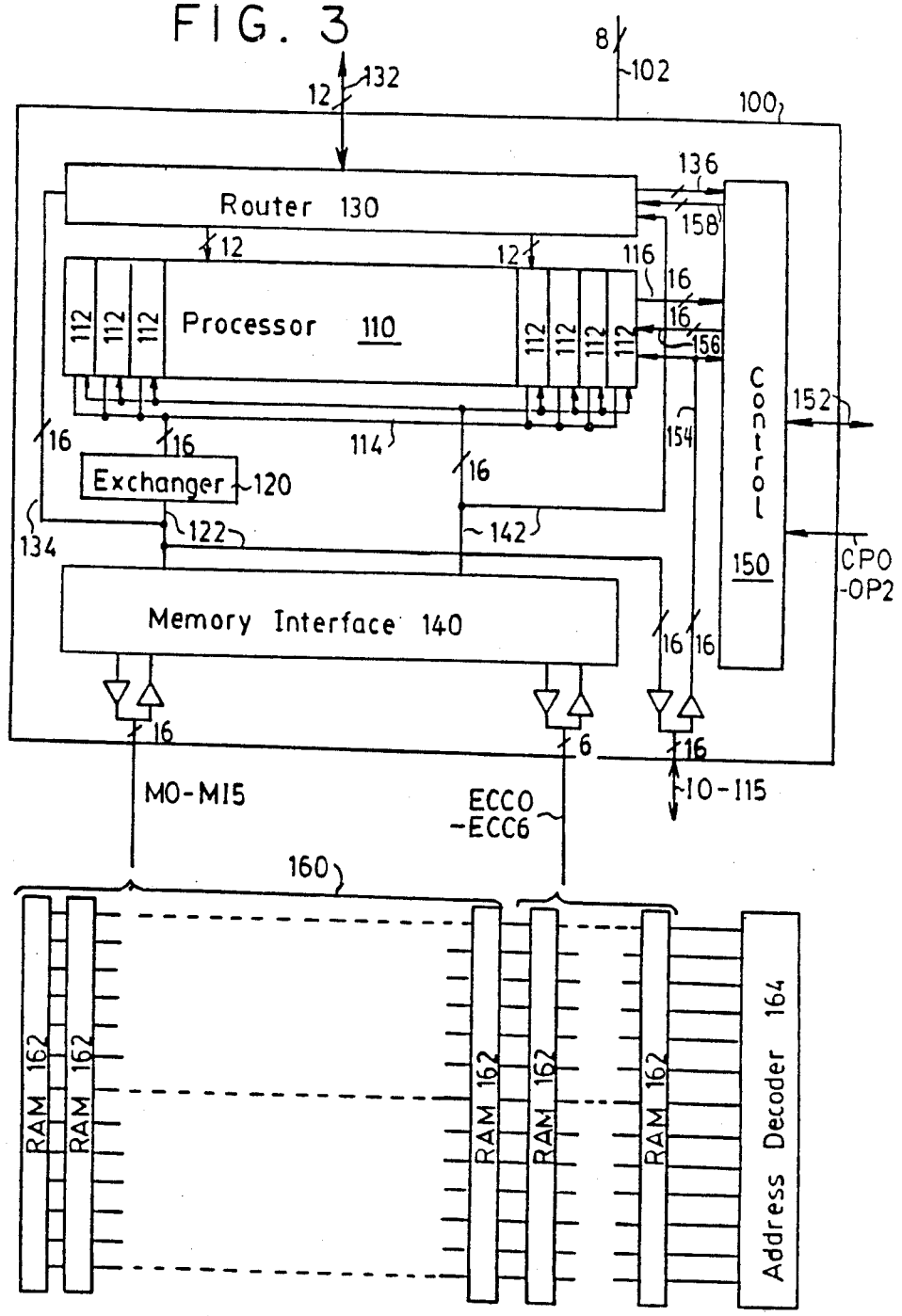
FIG. 3 is a schematic illustration of integrated circuits that implement a preferred embodiment of the present invention.

On each circuit board, thirty-two integrated circuits are mounted. As shown in FIG. 3, each such integrated circuit 100 comprises an array 110 of sixteen processors 112, an exchanger 120, a router 130, a memory interface 140, and a control circuit 150. Each circuit board also mounts 4K bits of read/write memory (RAM) 160 for each processor 112 of each integrated circuit mounted on the board.

Each integrated circuit 100 has sixty-eight pins for connection to the rest of the computer. Of these pins, there are four control pins 152, twenty processor instruction pins OP0-OP2, I0-I16, twenty-two memory pins M0-M15 and ECC0-ECC5, fourteen communications pins 132 and eight power supply pins 102. A further description of the function of these pins is set forth in Table I below.

TABLE I

| Name | Number | I/O | Assertion Level | Description |
|---|---|---|---|---|
| Control Pins | | | | |
| Clock | 1 | Input | High | Strobe to execute instruction |
| LED-CS | 1 | In/Out | Low | Chip select, active low and LED |
| Error | 1 | Output | Low | Error during current cycle, open drain |
| I/O | 1 | In/Out | High | Global output and input, open drain |
| Processor Instruction Pins | | | | |
| OP0-2 | 3 | Input | High | Type of instruction |
| I0-16 | 16+1 | In/Out | High | Instruction and Data bus + parity |
| Memory Pins | | | | |
| M0-15 | 16 | In/Out | High | Memory bus Data |
| ECC0 | 1 | In/Out | High | Error Check Bit 0 or Memory bus Data Parity |
| ECC1-5 | 5 | In/Out | High | Error Check Bits 1-5 |
| Communications Pins | | | | |
| Cube0-11 | 12 | In/Out | Low | Cube connection 0-11 |
| LatchR | 1 | Input | High | Latch Router Inputs |
| SendR | 1 | Input | Low | Send router outputs |
| Power Pins | | | | |
| VDD | 4 | power | High | +5 volts power |
| VSS | 4 | power | Low | ground |
| Total | 68 | | | |

An output from each of the sixteen processors 112 is applied via a sixteen line wide parallel data bus 114 to exchanger 120, each line of the data bus carrying signals from one processor. The exchanger permits the interchange or permutation of the signals on these lines as described more fully in the concurrently filed application for "Method and Apparatus for Simulating M-Dimension Connection Networks in an N-Dimension Network Where M is Less Than N". A sixteen line parallel data bus 122 from exchanger 120 supplies its output signals to memory interface 140 and to instruction pins I0-I15.

Memory interface 140 is described in greater detail in copending applications Ser. No. 4907,671, filed Sept. 15, 1986, for "Parallel Processor Error Checking" and Ser. No. 939,599, filed Dec. 10, 1986, for "Error Control Method and Apparatus", which are incorporated herein by reference. As shown in FIG. 3, memory interface supplies signals to memory 160 via memory pins M0-M15 and ECC0-ECC5 and receives signals from memory via the same pins.

Illustratively, as shown in FIG. 3, memory 160 is provided in the form of twenty-two 4K×1 bit RAM integrated circuits 162 associated with each integrated circuit 100. In each such memory each of sixteen 4K×1 bit slices functions as the memory for a different one of the sixteen identical processors 112. The remaining six 4K×1 bit slices store parity or syndrome bits for the data stored in the memories of the sixteen identical processors. Each of the twenty-two memory pins M0-M15 and ECC0-ECC5 from an integrated circuit 100 is connected to one RAM integrated circuit 162. Integrated circuits 162 are addressed in parallel by address decoder 164 so that parallel data is read from or written to each integrated circuit at the address specified by the address decoder. In practice a single address decoder can be used to control parallel addressing of all the RAM integrated circuits 162 on a single circuit board, or in an entire array of 65,536 processors. Further details concerning read/write memory 160 are set forth in the above-referenced '599 application.

Signals from memory interface 140 are supplied to each of the sixteen processors 112 and to router 130 via a sixteen line wide parallel data bus 142, each line providing signals to one of the processors.

Router 130 provides for communication with processors on other integrated circuits via an n-cube connection pattern illustratively of twelve dimensions (i.e., n=12). This connection is provided over twelve cube wires 132. The routers on all the integrated circuits 100 of the computer operate in parallel so that each router performs the same operation as all the other routers at the same time. The router can operate in any one of three modes: a forward mode in which messages are sent where they are addressed, a trace mode which records what messages went where, and a backward mode which routes messages backwards along a path established by routing messages in the forward mode. To permit operation in the backward and trace modes provision is made for recording the output of all switches in router 130 during every state of an operating cycle.

Router 130 is interfaced to processors 112 on integrated circuit 100 by a sixteen line wide parallel data bus 134, memory interface 140 and memory 160 and data bus 142. Each line of data bus 134 is associated with one of processors 112. Message packets that are received from processors on other integrated circuits are provided to their destination processor by placing the message packet on that one line of data bus 134 that is associated with the destination processor and forwarding it to memory 160 via interface 140. The message packet is then stored in memory 160 until it is fetched by its destination processor whereupon it is routed to that processor via interface 140 and the line in data bus 142 that is associated with that processor.

Message packets are routed to processors on other integrated circuits by supplying them via data bus 114, exchanger 120, data bus 122 and memory interface 140 to memory 160. When the router has circuitry available to forward the message packet toward its destination, the packet is supplied to the router via memory interface 140 and data bus 142 and sent to another integrated circuit over an appropriate cube wire 132. Further details of the operation of the router circuit are set forth below in conjunction with FIGS. 5-16.

Control circuit 150 comprises an instruction decoder (not shown) which decodes signals presented on the processor instruction pins to generate on-chip control signals. The instruction signals are provided to the control circuit by a sixteen line wide parallel instruction bus 154 and the control signals are provided to the various components of the integrated circuit on lines that are not shown. Control circuit 150 also comprises status registers (not shown in FIG. 3) which are distributed throughout the integrated circuit and store the state of switches in the data flow paths throughout the integrated circuit. This data makes possible operation of the router in the trace and backwards modes. Extensive status information is exchanged between the processors and control circuit 150 via sixteen line wide parallel data buses 116 and 156. Again each processor is associated with a different line of each data bus 116 and 156. Status information is also exchanged between control circuit 150 and router 130 via data buses 136 and 158.

Figure 4:
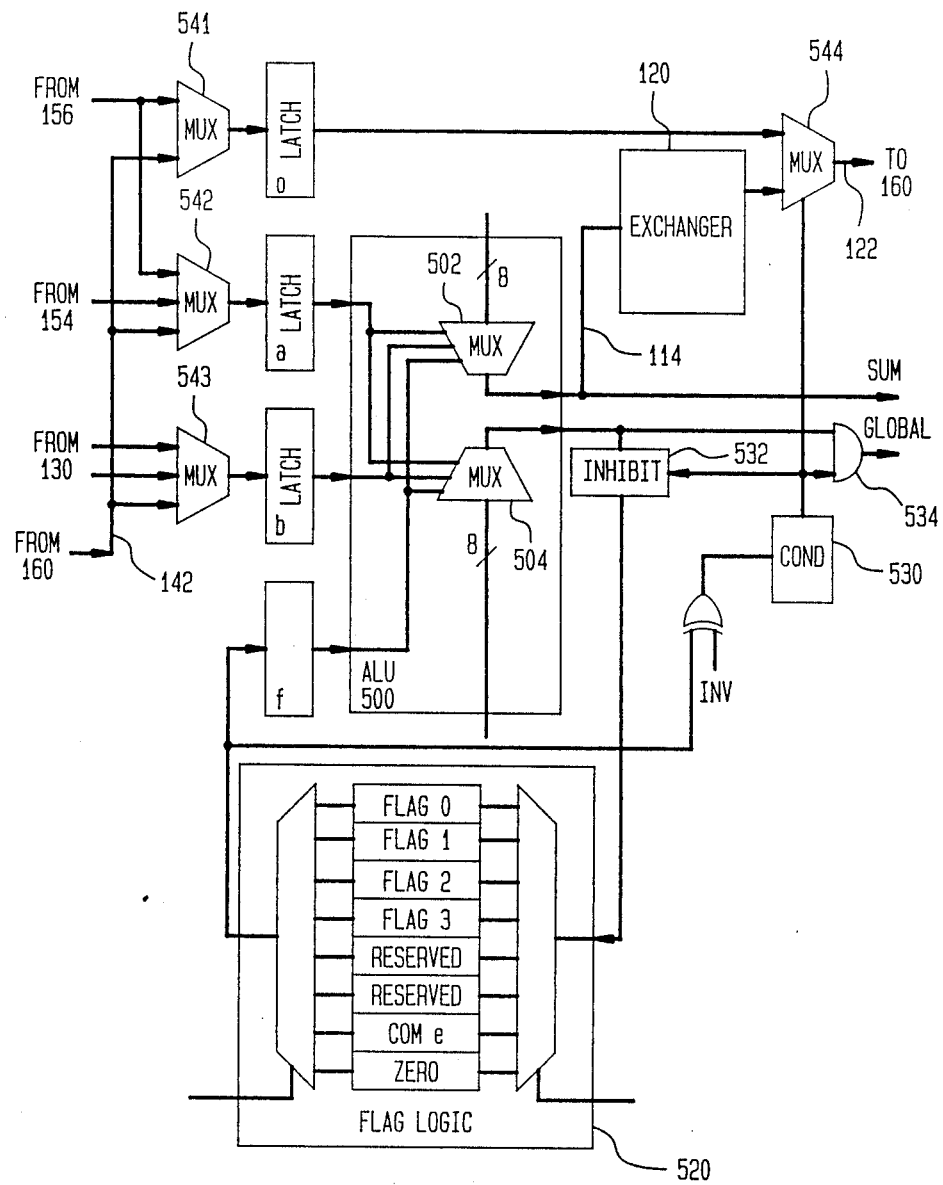
FIG. 4 is a schematic illustration of a processor implemented in one of the integrated circuits of FIG. 3.

While different embodiments of processor 112 can be used in the practice of the invention such as that described in the above-mentioned '400 patent, a preferred embodiment of processor 112 is shown in FIG. 4. As shown therein, the processor comprises an ALU 500, an eight bit flag circuit 520, four latches A, B, C, and F, a condition circuit 530 and four multiplexers 541, 542, 543, 544. The ALU contains two 8-to-1- multiplexers 502, 504 which implement two binary truth tables. The ALU operates on three inputs, one each from latches A, B, and F and produces two outputs, a sum output which is written to memory 160 via one of the lines of data buses 114 and 122, exchanger 120 and memory interface 140 and a carry output which is written to flag circuit 520.

Data is ordinarily written into latches A and B from memory 160 via one of the lines of data bus 132. Signals from router 130 can also be written to latch B via multiplexer 543 and signals from instruction bus 154 can be written to latch A via multiplexer 542. Latch F obtains its input from flag circuit 520. Latch C ordinarily is written via multiplexer 541 with the same data as latch A.

Condition circuit 520 determines whether the sum and carry outputs are written with the newly computed values or are rewritten with their previous values. The condition circuit is loaded from the flag circuit and controls the output of the ALU by means of gates 532, 534 and multiplexer 544.

Figure 5:
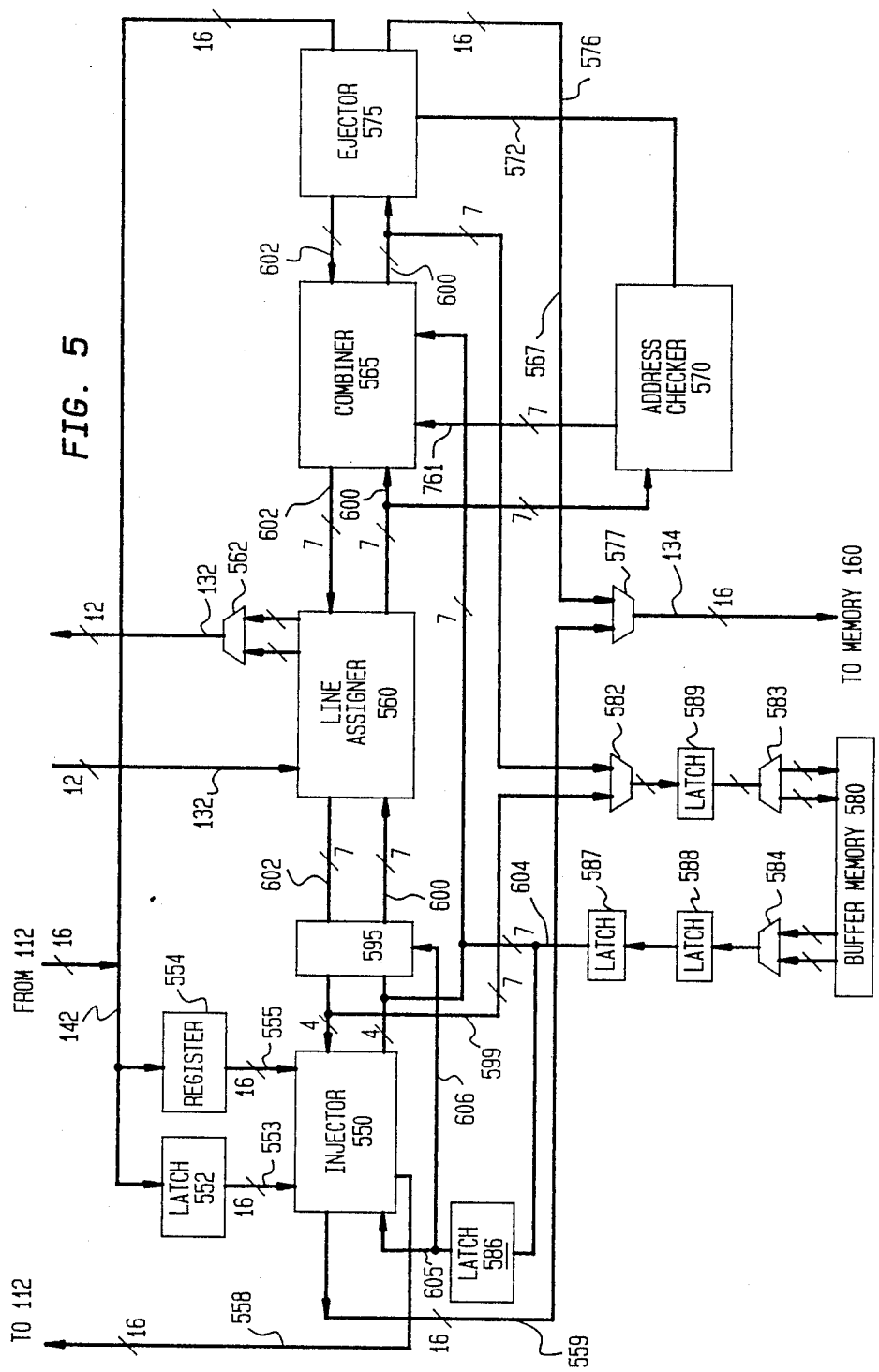
FIG. 5 is a schematic illustration of a router implemented in one of the integrated circuits of FIG. 3.

Further details of router 130 are shown in the schematic illustration of FIG. 5 which depicts a message packet injector 550, a line assigner 560, a combiner 565, an address checker 570, an ejector 575, an off-chip message packet buffer memory 580 and a parity generator 590. The apparatus further comprises a sixteen bit latch 552, a sixteen bit register 554, multiplexers 562, 577, 582, 583, 584 and seven bit wide latches 586, 587, 588 and 589. Data flows through the router over seven data paths 600 in the forward direction and seven data paths 602 in the reverse direction. Each of these paths in the forward direction and in the reverse direction is ordered in priority with respect to the other six paths of the same direction.

On leaving parity generator 590, the message packet contains address information, data and parity information illustratively in the format set forth in Table II.

TABLE II

| Bit Position | Value | Comments |
| --- | --- | --- |
| 0 | msg-p | indicates if message is valid |
| 1-12 | cube addresses [0]-[11] | identify physical cube wires 132 or dimensions over which message packet is to be routed |
| 13-16 | cube addresses [12]-[15] | identify processor addresses on an integrated circuit |
| 17 to K-1 | vp-addresses [0]-[n] | identify virtual processor addresses |
| K to L | data 0 to N | N+1 bits of message data |
| L+1 | parity | |

Injector 550 is a 4×16 cross-bar section which accepts a message packet from any of the sixteen processors 112 and place it one one of four of data paths leading to parity generator 590. A parity bit is then computed and added to each packet by parity generator 590 and the packet is forwarded to the line assigner 560. Message packets may also be received from message packet buffer memory 580 as will be described below.

The line assigner attempts to route the message packet out over the cube wires 132 to other integrated circuits in the different dimensions in accordance with the address information in the message packet. Simultaneously, routers at all the other integrated circuits are likewise attempting to route any message packets at those circuits. To route a message packet, the cube wires are checked one-at-a-time to determine if they are available for routing. If a cube wire is available, the message packet on the highest priority data path that is addressed to that cube wire (or dimension) is sent out on the cube wire. As a result, the data path 600 on which that message packet was located becomes available and the message packets on the other remaining data paths of lower priority are moved up one data path each, thereby freeing at least the lowest priority data path.

Message packets are also received on the cube wires 132 from other integrated circuits. Upon reception, each such packet is inserted onto the lowest priority data path and is processed in the same fashion as the message packets on the other data paths in the line assigner. Thus, each received message packet is shifted to data paths of higher priority as space becomes available on these data paths; and each will be routed out on a cube wire to which it is addressed if it has the highest priority among the message packets addressed to that cube wire. As a result, the message packet typically winds its way through at least portions of the line assigners on several different integrated circuits in the course of routing from a source processor to a destination processor. While such routing can be completed in one pass through the line assigner, it often may take more than one pass because of routing conflicts.

To ensure that a data path is available to receive a message packet over each cube wire, the line assigner will automatically route over each cube wire a message packet on the lowest priority data path whether the message packet is addressed to that path or not. This technique is referred to as desperation routing.

Message packets from the line assigner are delivered by data paths 600 to combiner 565 which combines the message packets that are destined for the same address. The combiner can perform any one of four operations on the message packets: max (choose the largest binary value destined for the processor), add (add the messages going to a given processor) or (logically or the messages going to a given processor), and overwrite (choose the last delivered message).

The address checker 570 checks the address of the message packets leaving the line assigner and identifies to ejector 575 via line 572 those that have reached their destination integrated circuit. Ejector 575 is a 7×16 cross-bar switch which enables a message packet on any one of the data paths to be delivered via sixteen line data bus 576 and memory 160 to any of the sixteen processors 112. In particular, the message is delivered to the B register of the processor via the appropriate line of data bus 142.

The message packets on the seven data paths are also delivered to the off-chip message packet buffer memory 580 where they are buffered and from which those that have not been delivered are inserted back into the parity generator 590. Advantageously, the buffer memory can be implemented in a portion of memory 160.

To avoid loss of data, the message packets from the buffer memory have priority over any message packets that are to be inserted from processors 112. In other respects they are processed by the router in the same fashion. Thus, the parity bit for each such message packet is recomputed by parity generator 590 and added to the packet and the packet is passed on to the line assigner via one of data paths 600.

Data flow in the backward direction over data paths 602 is similar but in this case the message packets from processors 112 are introduced into the router through ejector 575 and are passed through the combiner 565, line assigner 560, parity generator 590 and injector 550. Backwards routing uses the trace mode of operation to record the states of the parallel processor that are required to pass messages from one or more source processors to one or more destination processors. It then uses these states in reverse order to send messages from the destination processors back to the source processors. The combiner functions to duplicate the message packet in exactly the reverse of the combining process used in forward message passing so that a message packet can be broadcast to a multiplicity of processors. The line assigner routes the message packets back to the integrated circuits from which the original messages originated. The injector then delivers the message packets to the appropriate processors or buffers the packets in buffer memory until the packets can be delivered.

Figure 6:
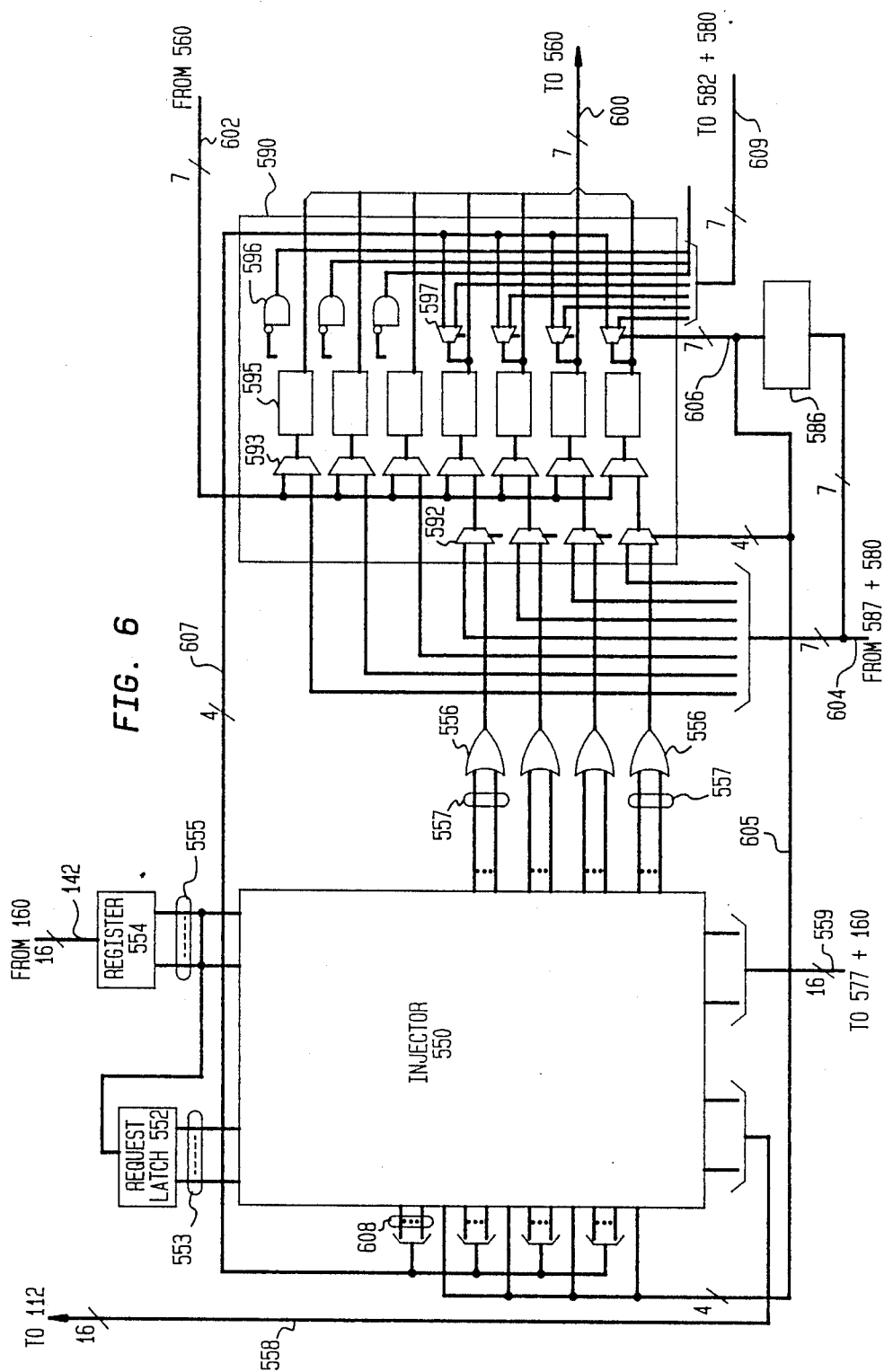
FIG. 6 is a more detailed block diagram of parity generator 590 of FIG. 5.

FIG. 6 illustrates data flow into and out of injector 550 and parity generator 590. In addition to these elements, FIG. 6 also depicts sixteen bit wide request latch 552, a sixteen bit wide register 554 and seven bit wide latch 586. Each bit position in latch 552 and register 554 is associated with a different one of the sixteen processors 112 and is connected to a different column of the 4×16 cross-bar switch of injector 550. Each bit position in latch 586 is associated with a different one of the data paths in buffer memory 580 and the presence of a one-bit at such a position in latch 586 signifies that the data path is available for receipt of a message packet. Latch 586 accordingly will be referred to as the data path available or empty latch. Also shown are four OR gate arrays 556, each of which is associated with one of the rows of the 4×16 cross-bar switch of injector 550. Each OR gate array has sixteen input lines 557, one from each of the columns in the same row of the 4×16 cross-bar switch of injector 550.

Parity generator 590 comprises a first array of four input multiplexers 592, a second array of seven input multiplexers 593, seven parity bit calculation circuits 595, four output multiplexers 597 and three output gates 598. Each input multiplexer 592 has two inputs, one from an output of an OR gate array 556 and the other from one of four of the data paths of data bus 604. Each input multiplexer 593 has two inputs, one from one of the data paths of backward data bus 602 and the other from an output of input multiplexer 592 or one of the remaining data paths of data bus 604. An output of each of the seven multiplexers 593 is applied to a different one of the seven parity bit calculation circuits 595; and an output of each parity circuit is applied to line assigner 560 via one of forward data paths 600. These outputs of the parity circuit are also connected via multiplexers 597 and gates 598 to a seven bit wide parallel data bus 599 to latch 582 and buffer memory 580.

Message packets from the sixteen processors 112 are made available though register 554 and data bus 555 to injector 550; and message packets from the buffer memory 580 are made available through register 587 and seven line parallel data bus 604 to parity generator 590. The existence of a message packet waiting to be sent from a processor is signified by a single one-bit at the location in request latch 552 associated with that processor. Signals from request latch 552 are applied via data bus 553 to each column of the 4×16 cross-bar switch of injector 550, each of sixteen bit positions of the latch being associated with a different column of the switch. Signals indicating that space is available on a data path and that the message packet can be sent are provided to processors 112 on sixteen line wide data bus 558, each line being associated with a different processor in the same way as are the lines of buses 142, 553, 555 and the columns of the 4×16 cross-bar switch of injector 550.

As indicated above, the absence of a message packet in the buffer memory at a location associated with a particular data path is signified by a single one-bit at the appropriate location in empty latch 586 associated with that data path. Four signals from the four bit positions of empty latch 586 that are associated with the four lowest priority data paths are applied via data bus 605 in parallel to the four rows of the 4×16 cross-bar switch of injector 550 and to the four multiplexers 592 associated with those rows. A one-bit in empty latch 584 conditions the row of the cross-bar switch to which it is applied to accept a message packet from register 554, if a available, and it conditions the multiplexer 592 associated with that row to accept the input signal from the OR gate array 556 associated with that row and reject any signal present on the data path input from data bus 604.

Control signals applied to multiplexers 593 control the direction and flow of signals from the seven forward flowing data paths 600 and the seven backward data paths 602. In particular, the control signals applied to multiplexers 593 select either the backwards flowing signals from data paths 602 or the forward flowing signals from injector 550 and/or data bus 604 for processing by the parity bit calculation circuit.

Seven signals from the seven-bit positions of empty latch 586 are applied via data bus 606 to multiplexer 597 and gates 598. The signals to gates 598 control access to three of the seven lines of a parallel data bus 609. The signals from latch 586 to multiplexers 597 make the outputs of four of the parity calculation circuits selectively available either to a four line parallel data bus 607 or to the remaining four lines of parallel data bus 609. Each of the seven lines of data bus 609 is connected to latch 582 and buffer memory 580.

Each of the four lines of data bus 607 fans out to a sixteen line parallel bus 608, each of which is applied as an input to a different switch in a different column but the same row of the 4×16 cross-bar switch of injector 550. Message packets on lines 608 that are destined for the sixteen processors 112 on the same integrated circuit as injector 550 are delivered to these processors on the lines of sixteen line wide parallel data bus 559, each line of which is connected to one of the columns of the 4×16 cross-bar switch of injector 550 and is associated with one of the sixteen processors.

Figure 7:
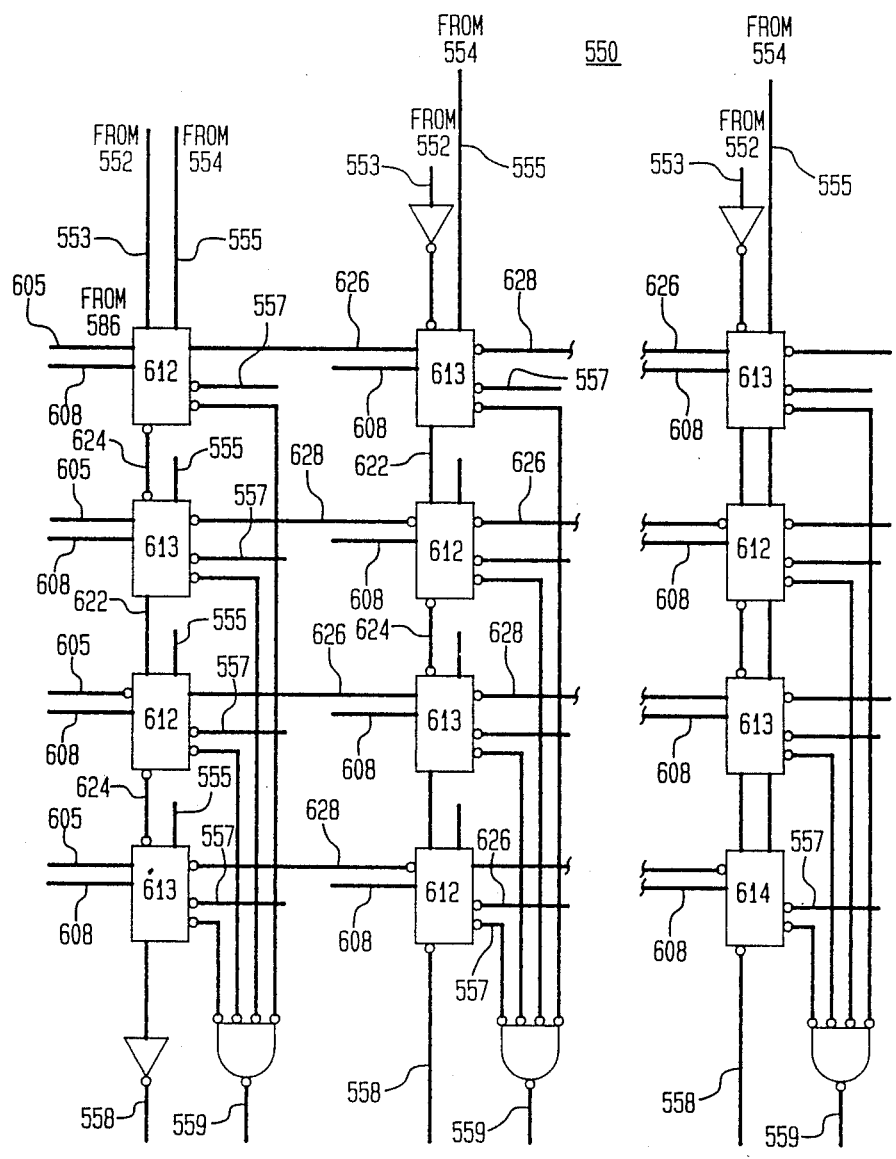
FIG. 7 is a more detailed block diagram of injector 550 of FIG. 5.

Further details of the injection circuitry of injector 550 are set forth in FIG. 7. This circuitry comprises a 4×16 cross-bar switch array 610 of two types of cells 612, 613 which is represented in FIG. 7 by the first two and last columns of such cells. Each column is associated with one of the processors 112 on the chip and receives from that processor on line 553 a request to send signal indicating that a message packet is waiting to be sent and on line 555 the message packet itself. In each column, the request to send signal propagates through each cell of the column on lines 622 and 624. In each column, the message packet is made available in parallel to all the cells of the column, but is received by only one of them as described below.

The four rows of the array are four of the seven data paths available in the injector and, in particular, the four paths with the lowest priority. Signals indicating the absence of a message packet on that data path in the buffer memory are applied to the cells of each row via lines 605 and are propagated through the array via lines 626 and 628. Forward flowing message packets are delivered to OR gate arrays 556 on lines 557. Backward flowing message packets are provided to the cells of the array on lines 608 and are delivered to processors 112 via sixteen lines 559.

The array of cells constitutes a two-dimensional grant-tree which decides on the basis of the signals on lines 553 from the processors and lines 605 from the message packet buffer memory whether there is space available on a data path to accept a message packet from a processor 112. If space is available, the processor is notified via a grant line 558 associated with that processor and the appropriate cell is conditioned to receive the message packet from the processor and place it on the otherwise empty data path.

Figure 8:
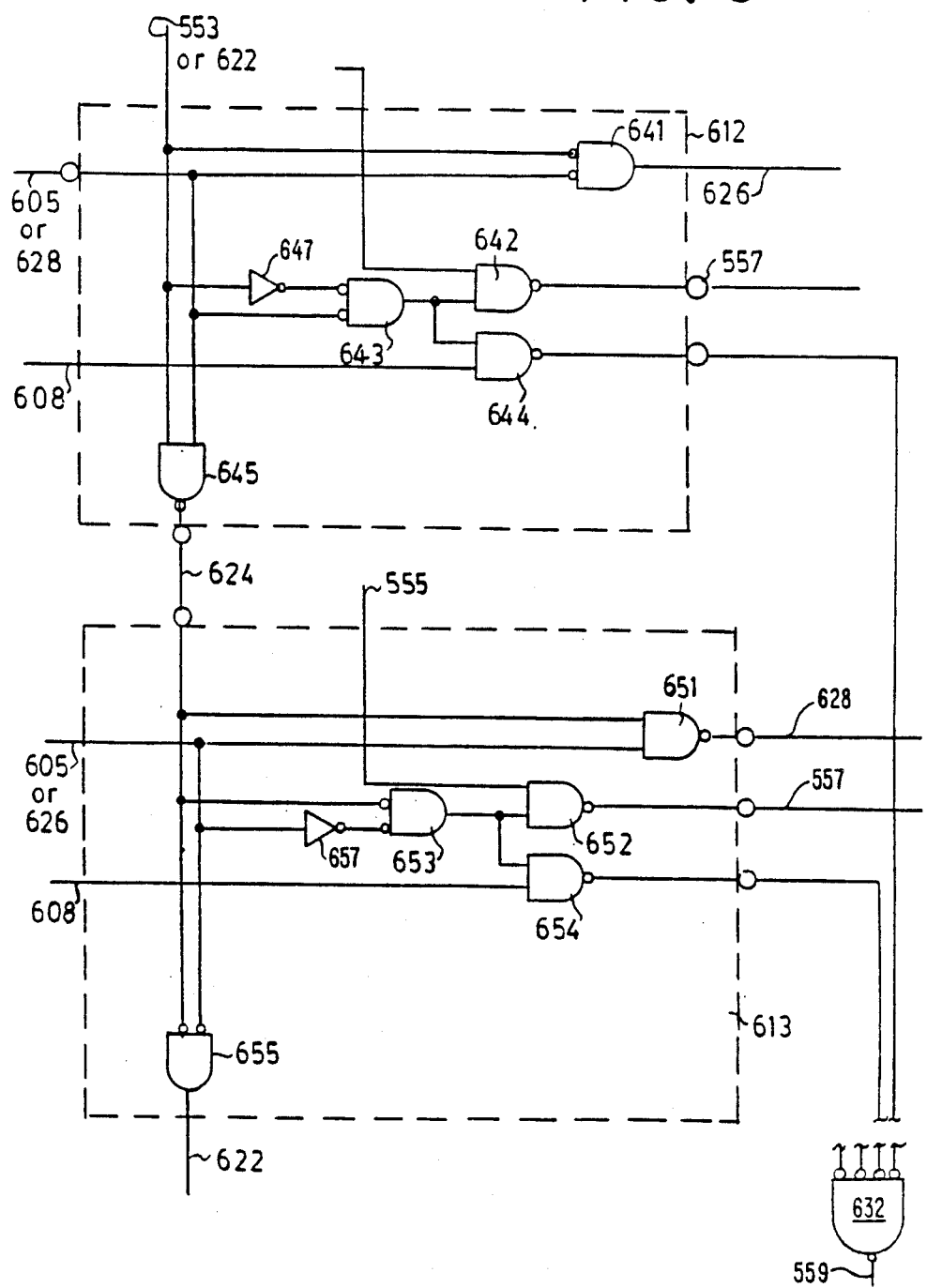
FIG. 8 is a schematic diagram of two cells depicted in FIG. 7.

Details of two of the cells 612, 613 are set forth in FIG. 8. Illustratively, these are the cells in the upper left hand corner of array 610 of FIG. 7. As shown, cell 612 comprises an array of five logic gates 641-645 and inverter 647. Cell 613 contains a similar array of five logic gates 651-655 and inverter 657. This circuitry is connected so as to insert a message packet from a processor on the available data path with the highest priority and to prevent insertion of the message packet on any other data path. Whenever a data path is occupied in this fashion it is also necessary to change the signal on lines 626, 628 in that row to indicate that the data path is now occupied. Thus, the processors also have a prioritized access to the data paths with the processor associated with the left-most column having the highest priority and those associated with the columns to its right having successively lower priority.

These functions are achieved by connecting the logic gates of cells 612 in one pattern and those of cells 613 in a second pattern. Further, the logic is designed so that the signals on a request line and a data path empty line are processed differently for cells 612 than for cells 613. In particular, each cell 612 includes an inverter on the data path empty line 605 or 628 as shown by the bubble on that line, a NAND gate 645 and an AND gate 641 with inverting inputs. Conversely, each cell 613 includes an inverter on the request line 624, an AND gate 655 with inverting inputs and a NAND gate 651.

As shown in FIG. 8, if a high signal is received by a cell 612 on request line 553 or 622 and a high signal on line 605 or 628, the output signal from gate 643 is high thereby enabling gate 642 to which is applied on line 555 the message packet from the processor associated with this column. As a result, the message packet is passed through gate 642 onto line 557 to OR gate array 556 which has inputs from every other line 557 from the same row of array 610. The high signals input on lines 553 (or 622) and 605 (or 628) also produce a low output signal on line 626 from gate 641 that indicates that the data path associated with that row is now occupied; and this signal will be propagated on the same row through the remaining columns of the array. Thus, no matter what polarity is present on a request line 626 input to a cell 613 in a lower priority column, a low polarity on line 626 will disable gate 653 and force the output signals from gate 651 to be high; and no matter what polarity is present on a request line 553 or 622 input to a cell 612 in a lower priority column a low polarity on line 628 to such cell will disable gate 643 and force the output signal from gate 641 to be low. When gate 653 is disabled, gate 652 on line 626 is also disabled so that a message packet cannot be accepted by that cell 613; and when gate 643 is disabled, gate 642 is also disabled so that a message packet cannot be accepted by that cell 612.

The high signals input to a cell 612 on line 553 (or 622) and 605 (or 628) also produce a high signal at the output of gate 645 and a low signal on line 624 which indicates that no request is being made to have the remaining data paths accept a message packet. This signal is propagated through the remaining rows of the same column. Thus, no matter what polarity is present on data path available line 605 to cell 613 in a lower priority row, a low polarity on line 624 to such cell will disable gate 653 and force the output signal from gate 655 to be low; and no matter what polarity is present on a data path available line 605 (or 628) to a cell 612 in a lower priority row, a low polarity on line 622 to such cell will disable gate 643 and force the output signal from gate 645 to be high. Again, disabling of gate 653 or 643 prevents a message packet from being accepted by cell 613 or 612, respectively. Finally, the signal that propagates through each column on lines 622 and 624 is output on line 558 and returned to the processor 112 as a grant signal that will have one polarity if the request has been granted and the opposite polarity if it has not, thereby informing the processor if it can send the message packet to the injector.

If, however, a request to transmit is made to a cell 612 but is refused because of the unavailability of the data path with which that cell is associated, then the output of gate 645 will be low, thereby enabling gate 653 in cell 613 immediately below. If the data path associated with that cell is available, the signal applied to inverter 657 will be high and the output of gate 653 will be high, thereby enabling gate 652 to accept the message packet. Under such circumstances, the output of gate 651 will indicate that the data path is no longer available and the output of gate 655 will indicate that the request has been granted and no message packets are to be accepted by lower cells in the same column. If the data path associated with cell 613 is not available, the output from gate 655 will be high and gate 643 in cell 612 immediately below will be enabled.

If no request to transmit is provided by line 622 to a column of the array, any data path available signal input on line 605 on any row to that column of the array will be forwarded to the cell in the same row of the next column and so on until a request to transmit is encountered in some column of the array.

Gates 643 and 653 also control enablement of gates 644 and 654 to which are applied lines 608. Thus the signals from latches 552 and 586 are also used to accept backward flowing message packets for delivery to processors 112 via gate 632 and one of the lines of data bus 559.

Forward flowing message packets are provided on data bus 600 to line assigner 560. The line assigner illustratively comprises a 7×12 array of substantially identical logic cells 562, each row of the array processing message packets on one of seven data paths and each column of the array providing communication via a cube wire 132 with a nearest neighbor integrated circuit in one of the twelve dimensions of the communication network. The first, second and last columns of these logic cells are shown in FIG. 9.

Figure 9:
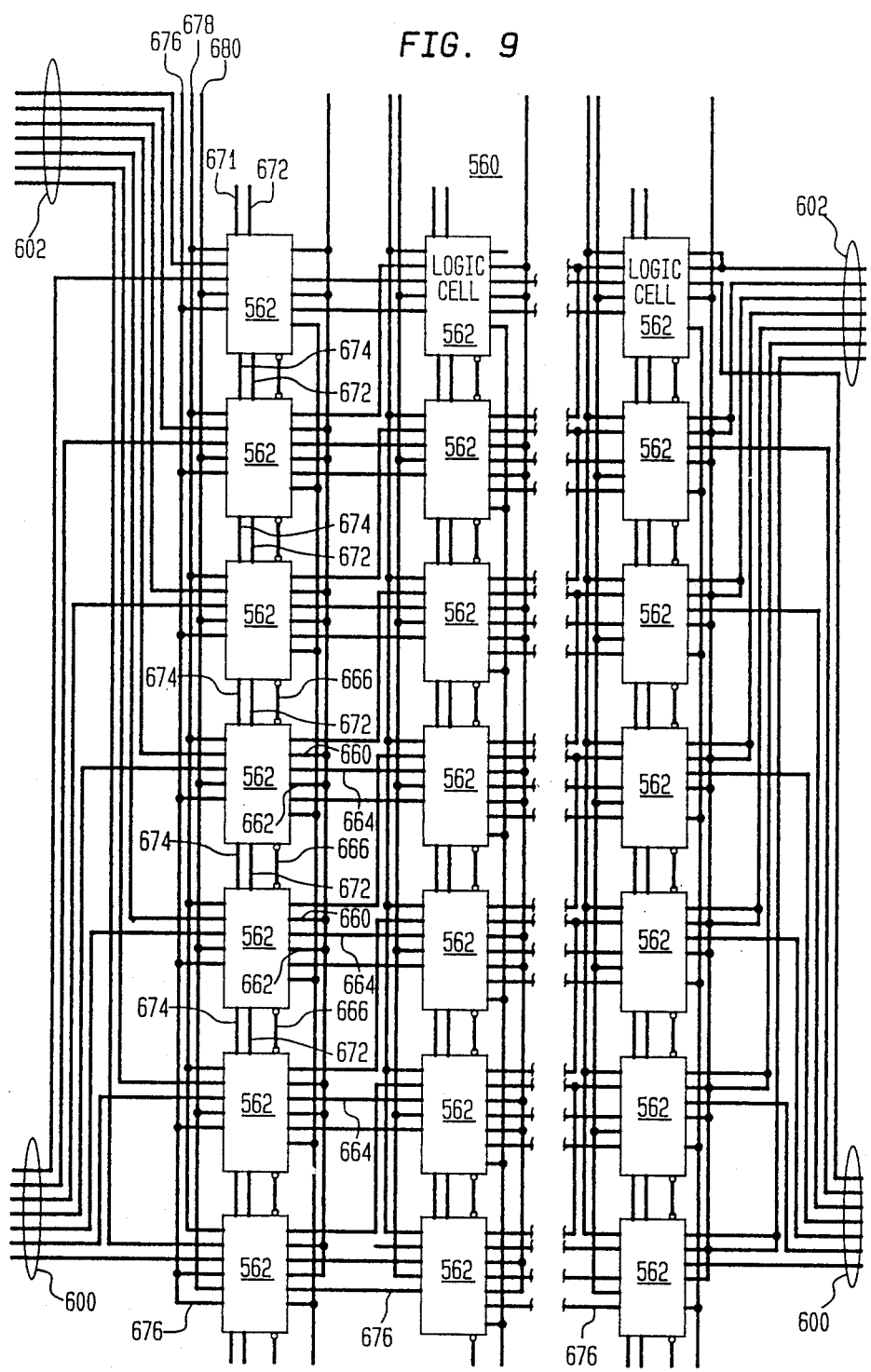
FIG. 9 is a more detailed block diagram of line assigner 560 of FIG. 5.

Each of the seven data paths of data bus 600 is applied as an input to one of the seven cells 562 in the first column of cells of line assigner 560 at the left-hand side of FIG. 9. Message packets may also be input to each cell on lines 660 which connect to the cube wire associated with each cell. Depending on what other signals are present at the cell, forward flowing message packets received by a cell may be routed out of that cell on any one of line 662 which connects to the cube wire associated with the column in which the cell is located, on row line 664 which provides an input to the cell in the same row but next column to the right in the array, and on column line 666 which provides an input to the cell immediately above in the same column. As will become apparent below, the message packets that are routed to the cell immediately above are actually provided to the cell in that same row in the column at the right.

Backwards flowing message packets flow through the array in the reverse direction. Each of the seven data paths of bus 602 is applied as an input to one of the seven cells in the last column of the array at the right-hand side of FIG. 9. Message packets may also be input to each cell on line 660 which connects to the cube wire associated with each cell. Depending on the signals present in the cell, backward flowing message packets may be routed out of that cell on any one of line 662 which connects to the cube wire associated with the column in which the cell is located or on line 668 which provides an input to both the cell in the same row but next left column of the array and the cell immediately below it.

Control signals are applied to the cells on lines 672, 674, 676, 678, 680. A priority signal on line 672 establishes priority of access to the cubes for the signals on the data paths. In particular, circuitry in the cells use the signal on line 672 so as to provide access to cube wire 132 to the uppermost message packet in the column that is addressed to that dimension and to prevent any message packet in lower cells in that column from being routed onto the cube wire. A high signal on line 672 at the input to a cell permits the cell to route a message packet onto a cube wire 132. A low signal prevents it. Thus, a low signal applied to the uppermost cell in a column effectively removes the cube wire from the network which permits the size of the network to be altered by controlling the signal applied to line 672. In addition if a specific wire of the interconnection network fails, it can be eliminated from the network simply by biasing the corresponding line 672 with a low signal.

An all full signal on line 674 informs the individual cells of each column whether there is a message packet in every cell above it in the column. If any upper cell is empty, the message packets in each lower cell are moved up one cell in the column. Line 676 identifies the row of the array from which message packets will be desperation routed in order to assure that one cell in each column is always available for receipt of a message packet over a cube wire. Ordinarily this row is the bottom row of the array, but it can be changed by software control by means of line 676. Timing signals are provided to each cell on lines 678, 680. In particular, the signal on line 678 to each column of cells controls the operation of latches 712, 714. The signal on line 680 controls the operation of latches 692, 694. As a result, the timing of all the line assigners in the parallel computer can be synchronized so that at the same time each first column of all the line assigners processes the first address bit of each message packet in that line assigner, and at the same subsequent time each second column processes the second address bit of each message packet, and so forth.

Figure 10:
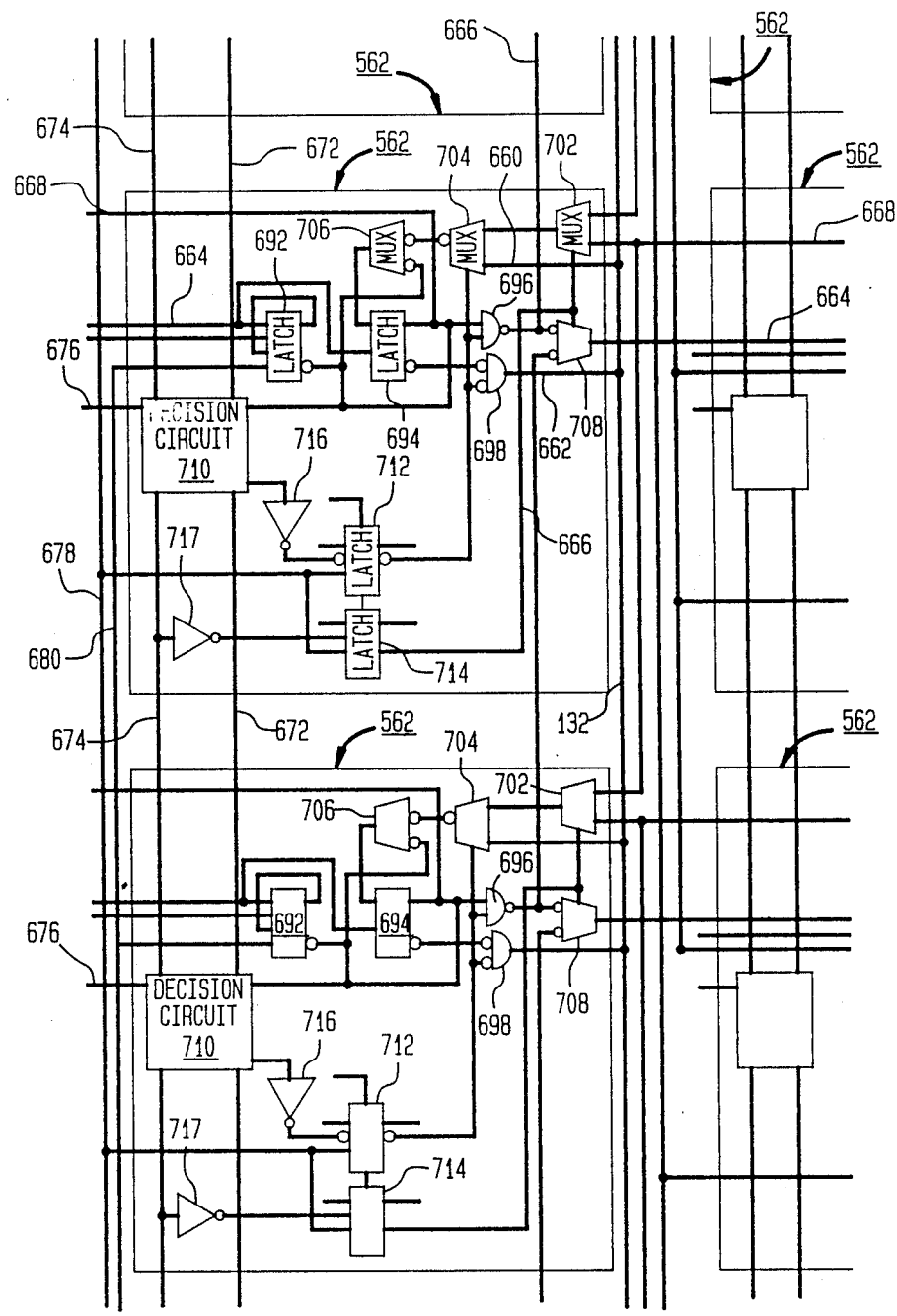
FIG. 10 is a schematic diagram of two cells depicted in FIG. 9.

Further details of 562 are shown in FIG. 10. Each cell comprises first and second message latches 692, 694, first and second gates 696, 698, four multiplexers 702, 704, 706, 708, a decision circuit 710 and control latches 712, 714. As will be explained more fully below, at the time a routing decision is made in a column of cells, each latch 694 in the column stores the msg-p bit at the beginning of a message packet signifying the presence or absence of a message packet to be routed by that cell and each latch 692 stores the address bit for the dimension of the cube wire 132 that is connected to that column of cells. The data stored in latches 692, 694 is provided to decision circuit 710 via lines 693, 695 respectively; and control signals 672, 674, 676 are also provided as inputs to this circuit. The outputs of circuit 710 are applied to latches 712, 714 to determine the routing path of a message packet received at the cell. A high signal at the output (i.e., prior to the inversion represented by the bubble at the output terminal) of latch 712 will disable gate 696 and therefore signal flow to line 666 and will enable gate 698 whose output is connected to a cube wire 132. Conversely, a low signal will enable gate 696 and disable gate 698. Thus, latch 712 controls whether the cube wire takes the message packet. The operation of each latch 712 is controlled by the priority signal on line 672 in that column and the presence of an address bit for the dimension of the cube wire connected to that column of cells.

The output of latch 714 controls multiplexer 708 in that cell which selects between the message packet provided at the output of gate 696 of the cell or that at the output of gate 696 of the cell immediately below in the same column. The message packet that is chosen is provided to row line 664 as the input to the cell in the same row, but next column to the right. Thus, latch 714 determines if the message packets are to be compressed upward in the column of cells. The operation of each latch 714 is controlled by the all full signal on line 674, the msg-p bit in latch 694 and whether the cell has granted a message packet access to the cube wire.

In similar fashion, these latches also control message packet flow in the backwards direction. Thus, the output signal from latch 714 determines if multiplexer 702 accepts the input on line 668 from the cell in the same row of the column to the right or the input on line 668 from the cell one row above. And, the output signal from latch 712 determines if multiplexer 704 accepts the input from multiplexer 702 or the input from cube wire 132.

Figure 11:
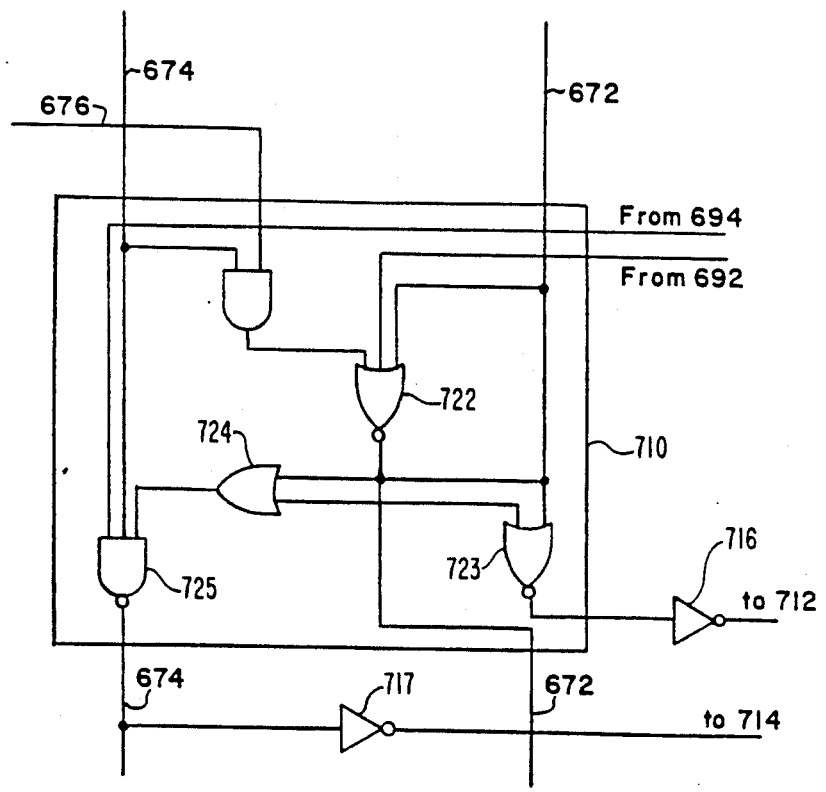
FIG. 11 is a schematic diagram of decision circuit 710 of FIG. 10.

Details of decision circuit 710 are set forth in FIG. 11. As shown therein, the circuit comprises an AND gate 721, NOR gates 722, 723, OR gate 724, and NAND gate 725. Also shown are inverters 716, 717 in the input lines to latches 712, 714. The function of the circuit is to control the delivery of message packets from the cell to cube wire 132, row line 664 and column line 666 and to provide control signals on lines 672 and 674 which indicate, respectively, if the cube wire is busy and if an empty data path is available.

An empty data path will be available on the row line 664 through a cell if there is an empty data path in one of the higher rows of the line assigner as indicated by a low signal on line 674, if the row line through the cell is empty as indicated by a msg-p bit of zero value, of if the message packet in the cell is routed out on the cube wire. Each of these conditions is represented by a low signal on an input line to NAND gate 725. If they are satisfied, a low signal is provided on line 674 to the next lower cell indicating that an empty data path is available and the same signal is provided to inverter 717 on the input to latch 714. This signal causes multiplexer 708 to accept a message packet from the next lower cell and provide it to row line 664. If, however, each input to NAND gate 725 is high, the output of the gate 725 on line 674 is a high signal indicating that all higher data paths are full; and multiplexer 708 accepts the message packet from latches 692, 694 and provides it to row line 664.

A message packet is routed out on a cube wire 132 when either the message packet is addressed to that cube wire and has the highest priority of the message packets addressed to that wire as indicated by a high signal on input line 672 or all the data paths are full as indicated by a high signal on line 674 and the cell is selected for desperation routing by a high signal on line 676.

Lines 674 and 676 are tested for high signals by AND gate 721. The output of this gate as well as the priority signal on line 672 and the address bit from latch 692 are applied to NOR gate 722. If the message packet is addressed to the cube wire associated with the cell, the signal from latch 692 will be high. Under either of these circumstances the output of NOR gate 722 will be low. This output is applied to NOR gate 723 and OR gate 724 along with the priority signal on line 672. If access to cube wire 132 has not been granted in a higher priority cell in the column, the priority signal applied to gates 723 and 724 will be low. Thus the output of gate 723 will be high and the output of gate 724 will be low. A high output from gate 723 will cause gate 698 to route the message packet out on line 662 to cube wire 132; and a low output from gate 724 will hold line 674 from gate 725 low, indicating that there is an empty data path available.

The output from NOR gate 722 is also applied via line 672 to lower priority cells in the same column. A high signal from gate 721, latch 692 or the priority signal will produce a low output on this line indicating that the cube wire is not available.

In order to place the msg-p bit and the appropriate dimension address bit in latches 694 and 692 of a cell, it is necessary to shift the address bits of the message packet through the cells of the line assigner in a circular pattern. This is accomplished under software control of the two latches 692, 694 in each of the cells. The sequence of shifting is depicted in FIG. 12 for the passage of a message packet through a line assigner of twelve dimensions. In FIGS. 12A and 12B, each 2×12 row of boxes represents the contents of latches 692 and 694 in each of the twelve columns of cells in the line assigners through which a message packet propagates. Because of the routing operations that take place in the course of moving from the first column of cells to the last, it should be understood that the cells depicted in FIGS. 12A and 12B are not likely to be all in the same row of one line assigner and, indeed, are likely to be in several different rows of several different line assigners due to routing of the message packet over one or more cube wires.

Most of the bits in a message packet propagate through the latches 692, 694 of the cells of the line assigner so that the bits are first located in latch 692 and then latch 694 of each of the twelve cells in turn. Thus, in the representation of these latches in FIGS. 12A and 12B, the msg-p, data bits xo to dn and parity bit par follow a saw-tooth path from their entry point at latch 692 of the zero dimension cell to their exit point from latch 694 of the eleventh dimension cell. However, in the case of the address bits of the message packet, a different path is followed. In particular, the address bit for each dimension is checked by the cell associated with that dimension when the address bit is located in latch 692 of that cell and the msg-p bit is in latch 694 of that cell.

To position the address bits in this fashion, the address bits are routed in a different pattern. As shown for the case of cycle 1 in FIG. 12A, the first address bit ao is placed in latch 692 of the zero dimension cell and tested there for routing on the zero dimension cube wire. Thereafter, address bit ao is moved to latch 694 on cycle 2 and left there until cycle 14. Address bit al is moved into latch 692 of the zero dimension cell in cycle 2 and is then moved to latch 692 of the first dimension cell in cycle 3. There it is tested for routing of the message packet on the first dimension cube wire. It is then moved to latch 694 of the first dimension cell during cycle 4 and is left there until cycle 15. In like fashion each of the other address bits is moved to latch 694 of the cell in which it is tested for routing and is left there for twelve cycles.

After the last address bit all enters the line assigner, the address bits stored in latches 694 are withdrawn one-at-a-time and moved to latch 692 of the next dimension cell. From there they are passed through only latches 692 of the remaining cells until they leave the last cell. As a result of this arrangement, the message packet is reconstituted with the bits of the message packet back in the same order as when they entered the line assigner.

Figure 13A:
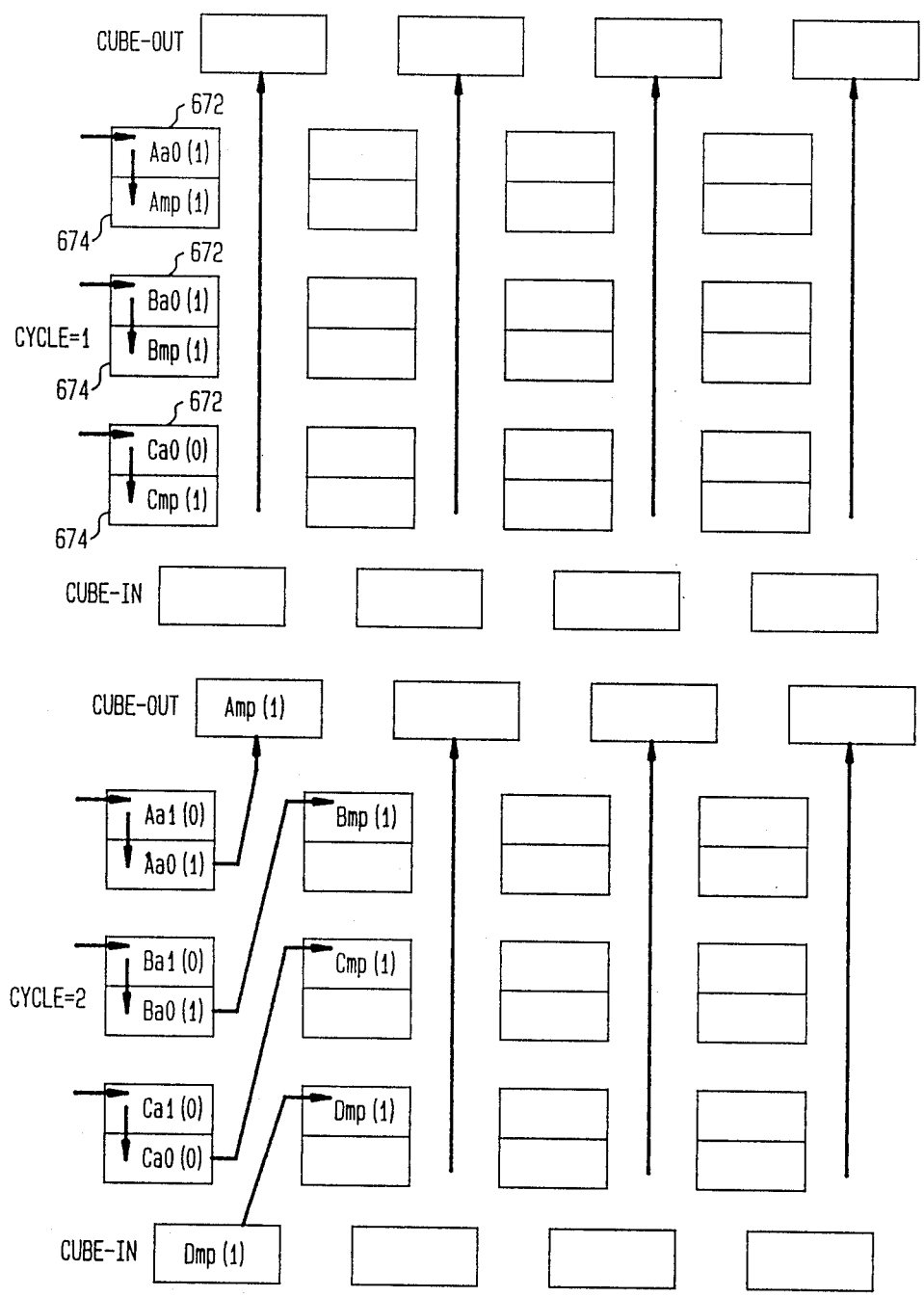
FIG. 13A and 13B are schematic illustrations depicting the routing of a plurality of message packets through line assigner 560.
Figure 13B:
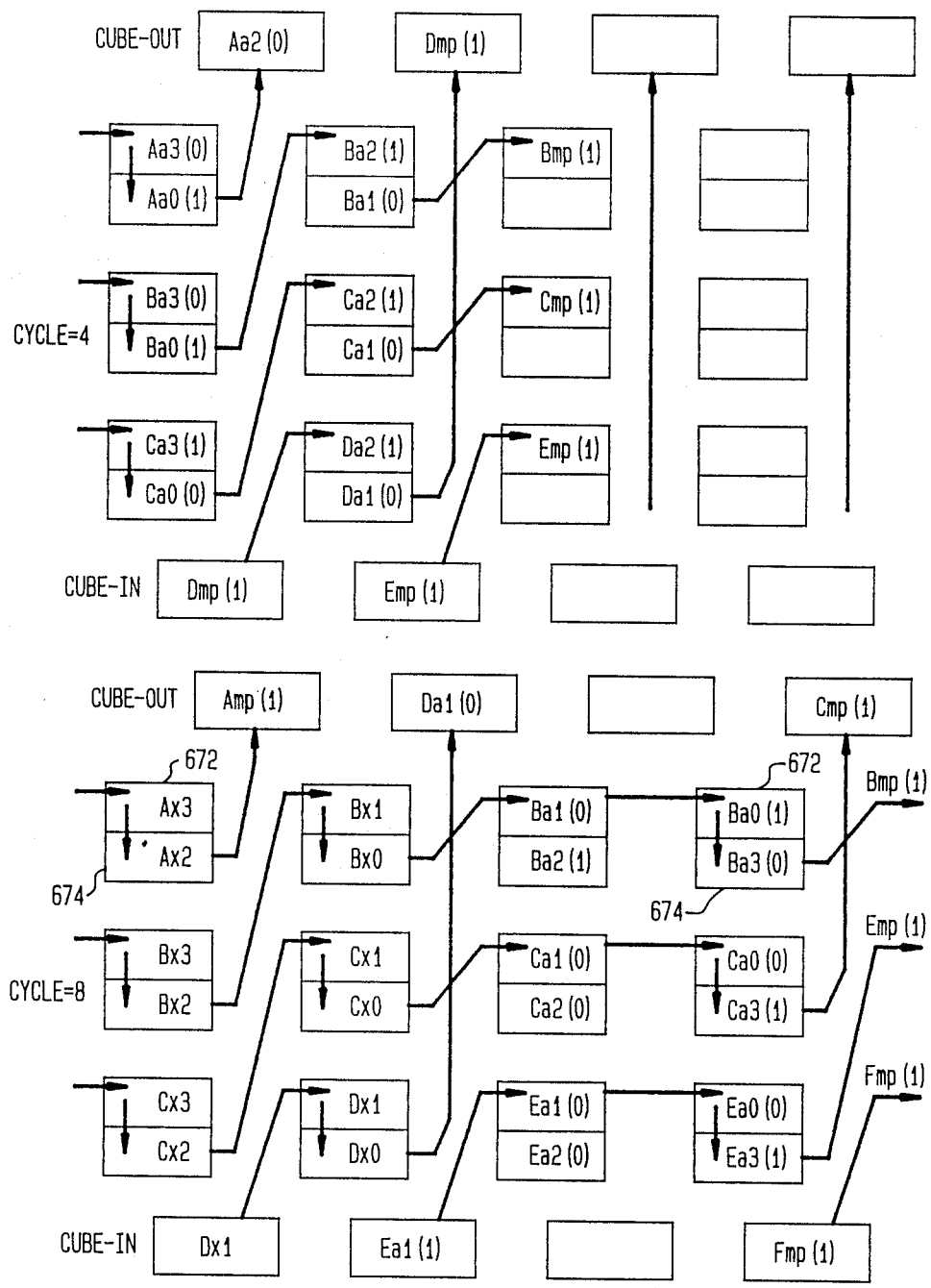

An example of the routing of message packets through line assigner 560 is set forth in FIGS. 13A and 13B. For purposes of illustration a line assigner of only three data paths and four columns is illustrated. Five message packets A, B, C, D and E are shown having the address bits set forth in Table III.

TABLE III

|   | mp | a0 | a1 | a2 | a3 |
|---|----|----|----|----|----|
| A | 1  | 1  | 0  | 0  | 0  |
| B | 1  | 1  | 0  | 1  | 0  |
| C | 1  | 0  | 0  | 1  | 1  |
| D | 1  | 0  | 0  | 1  | —  |
| E | 1  | 0  | 0  | 0  | 1  |

For convenience of reference these bit values are enclosed in parentheses in FIGS. 13A and 13B.

In cycle 1, message packets A, B and C are inserted into the line assigner. In cycle 2, message packet A is routed out on the zero dimension cube wire since it is addressed to that dimension and has the highest priority. Message packets B and C are pushed up on the data paths and packet D is received on the zero dimension cube wire and placed on the lowest priority data path.

None of the message packets remaining in the line assigner is addressed for routing in the first dimension. Nevertheless, in cycle 4, one of these message packets must be routed and the message packet on the lowest priority data path, packet D, is routed. Packet E is received on the first dimension cube wire and placed on the lowest priority data path.

Illustratively, the cube wire for the second dimension is disabled and no routing takes place in cycle 6. Since the highest priority message packet addressed to the third dimension is message packet C, it is routed out on the third dimension cube wire during cycle 8, packet E is moved up one data path and packet F is received and placed on the lowest priority data path.

As shown in FIG. 5, the message packets are then provided to combiner 565 and address checker 570. The address checker checks the message packets on each data path 600 to determine if the packets have reached their destination. Since the address bit in the message packet that addresses a particular dimension is inverted at the time the message packet is routed out on a cube wire of that dimension, the address bits must all be zero at the destination integrated circuit. Accordingly, the address checker simply checks for a zero in each of the address bits. If a non-zero bit is found, the message packet has not reached its destination and it is routed to the buffer memory via line 567 where it will be stored until another routing cycle begins. If all the bits are zero, the address checker stores in the memory latches the processor address bits at bit positions 13-16 of the example of Table II and provides to ejector 570 on line 572 instructions to deliver the message packet to the processor identified in the message packet. The address checker also provides the msg-p bit of each message packet to combiner 565 via seven line data bus 761.

Figure 14:
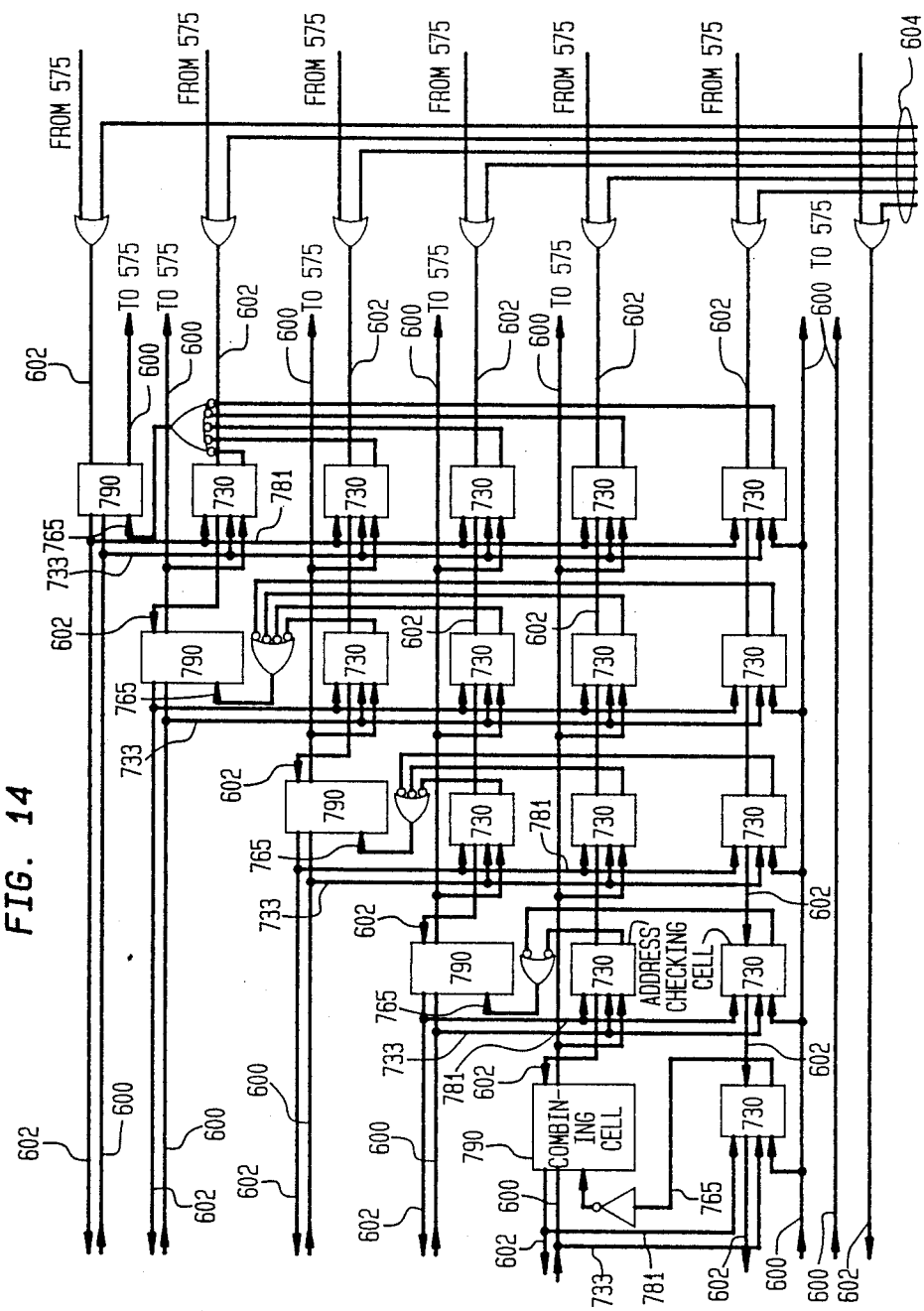
FIG. 14 is a more detailed block diagram of combiner 565 of FIG. 5.

Combiner 565 as shown in FIG. 14 comprises an array of two types of cells 730, 790. Cells 730 test the message packets on adjacent data paths 600 or 602 to determine if they are directed to the same destination processor. If they are, cell 790 is activated to combine the message packets in accordance with a predetermined operation. Illustratively, the operation may be selected from these four: max (choose the largest binary value destined for the processor), add (add the messages going to the processor), or (or the messages going to the processor) and overwrite (choose the last delivered message).

Figure 15:
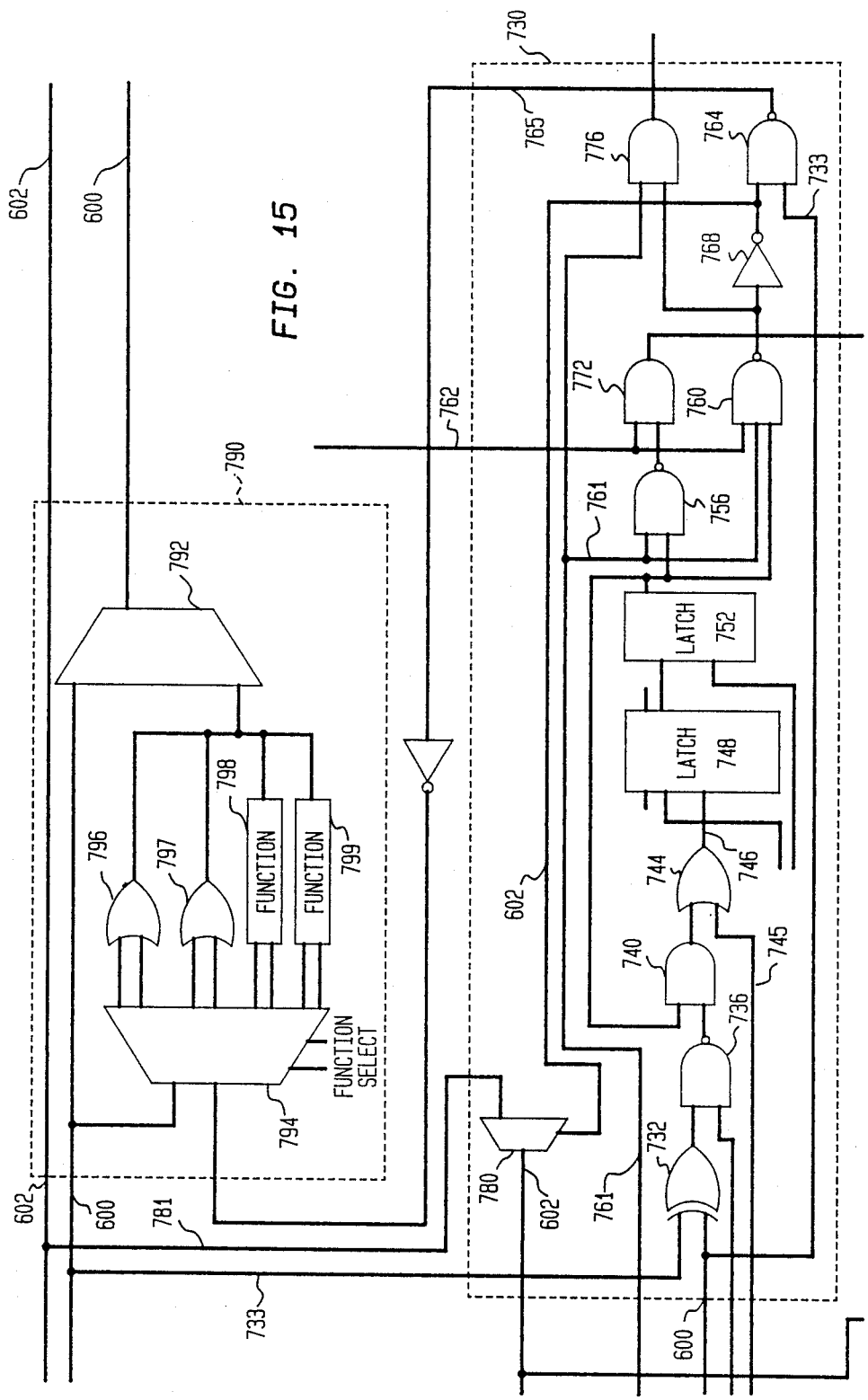
FIG. 15 is a schematic diagram of two cells 730, 790 depicted in FIG. 14.

Illustrative details of cell 730 are set forth in FIG. 15. As shown therein cell 730 comprises an exclusive OR gate 732, a NAND gate 736, an AND 740, an OR gate 744, latches 748, 752, NAND gates 756, 760, 764, inverter 768, AND gates 772, 776 and multiplexer 780. Latches 748, 752 are initialized by loading a one-bit into the latches through line 745, OR gate 744 and line 746. A one-bit in latch 752 enables AND gate 740. Exclusive OR gate 732 and NAND gate 736 function so as to compare the addresses of message packets on two adjacent data paths 600 which are supplied to the XOR gate via input lines 733, 600. A timing signal is supplied to NAND gate 736 on line 737 so as to sample the output of XOR gate 732 on line 735 for each bit position of the address of the message packet. This timing signal is used to sequence operation of the columns of cells of FIG. 14.

As long as the bits in the two addresses are the same, the output of XOR gate 732 is low, the output of NAND gate 736 is high and the signals applied to latches 748, 752 and the signals available at their outputs are high. If any pair of bits in the addresses differ, the output of the XOR gate goes high and the output of latch 752 goes low. Once that output goes low, AND gate 740 is disabled and the latch output will remain low until reset.

A high output from latch 752, a high value for the msg-p bit on line 761 from address checker 570 and a high signal on grant line 762 to NAND gate 760 will enable NAND gate 764, thereby passing the signal on line 600 from the lower priority data path to cell 790 via line 765. These signals will also produce a low signal on grant line 773 from AND gate 772 and will enable AND gate 776 to pass the msg-p signal on line 761 to the next cell 730 in the same row of the combiner.

With respect to data flow in the reverse direction, a high signal at the output of inverter 768 will cause multiplexer 780 to connect an input on line 781 from a data path 602 having the next higher priority to the backwards flowing data path 602 associated with the cell. As a result, the same signal will be present on both data paths and, in effect, the signal on the higher priority path will have been duplicated.

Cell 790 accepts message packets from data path 600 on which it is located and from one of cells 730 in the column below it if the two message packets have the same address. If only one message packet is provided to a cell 790, it is passed on by multiplexer 792 to a cell 730 on the same data path 600 but the next column to the right. If two message packets are received at cell 790, they are combined in accordance with the function selected by routing the message packets via multiplexer 794 to appropriate circuitry in cell 790 for executing the function. For example, the two message packets can be directed to an OR gate 796 if the OR operation is selected or to an exclusive OR gate 797 if the add operation is to be performed. Alternatively, the message packets could be directed to a full adder. Other circuits known in the art are available to implement the max and overwrite functions 798, 799 or other functions that might usefully be performed. The output of these circuits is likewise provided to cell 730 on the same data path 600 as cell 790 but one column to the right.

Cells 730 and 790 of combiner 565 will identify and combine all message packets addressed to the same destination processor 112 and will compact these message packets upwards on data paths 600 to the paths of higher priority.

The message packets are then provided to ejector 575. Ejector 575 is a 7×16 cross-bar switch that permits a message packet on any one of data paths 600 to be delivered to an output line associated with any one of processors 112. The ejector can also accept a backwards flowing message packet on lines 142 from processors 112 and provide such message packets to any one of data paths 602.

Figure 16:
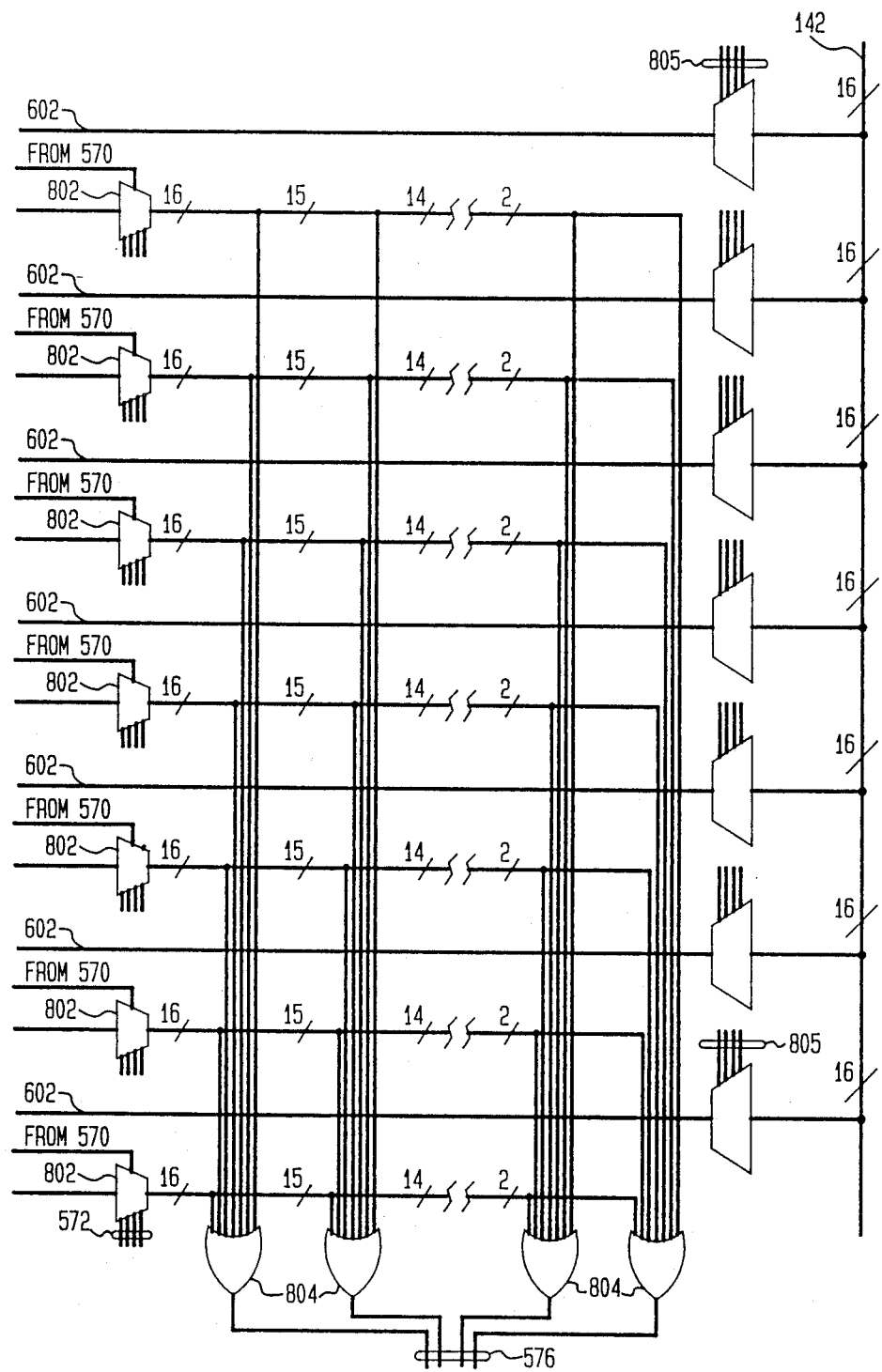
FIG. 16 is a more detailed block diagram of ejector 575 of FIG. 5.

Illustratively, as shown in FIG. 16, the ejector is implemented in the form of seven 1-to-16 multiplexers 802 and sixteen OR gates 804, each multiplexer having an input from one of data paths 600 and sixteen outputs, one to each of OR gates 804. The multiplexers are enabled by a signal on line 572 from address checker 570 indicating that a message packet has been received that is addressed to one of processors 112 on the integrated circuit. The particular output line from a multiplexer is selected by the processor address bits at bit position 13–16 in the Example of Table II which are applied on lines 572 from address checker 570 to the control input of the multiplexer.

Ejector 575 further comprises seven 16-to-1 multiplexers each of which has sixteen inputs, one from each of lines 142 from the sixteen processors 112, and an output to one of the seven lines of data bus 602. The particular input line to the multiplexer is selected by the processor address bits of the message packet which are applied on lines 805 to the control input of the multiplexer.

As will be evident from the foregoing description, latches are used to control the switching of message packets in the injector, line assigner and combiner. The status of these latches can be read at any time by control 150 and, in particular, the control can record the status of the latches during every cycle of the router. Since the status of the latches determined the routing path of the message packets in the forward direction, this information can also be used to route the message packets in the reverse direction by providing it back to the latches in the reverse order from that in which it was obtained from the latches. Thus, the last information used to route the packet in the forward direction is the first to be used to route it in the backward direction.

By use of this last in first out technique, a broadcast function can be provided in the parallel computer. Message packets can be routed in the forward direction to a common destination. These packets are combined by the combiners into a single packet which eventually is provided to the destination processor. A packet is then routed from the destination processor in the reverse direction by inserting it onto a message path in the ejector. At the combiner it is duplicated as the latches 748 in cells 730 recreate in reverse order the conditions under which the forward flowing message packets were combined. The duplicated message packets are then routed through the line assigner to the circuits from which the forward flowing message packets originated as latches 712, 714 in the line assigner cells recreate in reverse order the cube wire routing sequence and finally message packets are delivered to the processors that originated the forward flowing message packets as latches 552 and 586 recreate in reverse order the conditions under which the forward flowing message packets were originally accepted for routing.

As will be apparent from the foregoing, numerous variations may be practiced within the spirit and scope of the invention.

What is claimed is:

1. In a parallel computer comprising a plurality of processors and an N-dimensional interconnection network having in each of N dimensions communication lines over which the processors communicate with one another, N being equal to or greater than two, means for routing addressed message packets across said communication lines between a first processor to a second processor comprising at each of a plurality of nodes in said network:

a memory for storing message packets enroute from a source processor to a destination processor, means for selectively connecting a message packet that is addressed for routing to a communication line that is connected to a node between said source and said destination processors, said connection being made in response to address information in said message packet, means for selectively inserting into a queue at a source processor a message packet addressed for routing to a destination processor, means for selectively removing from a memory at a destination processor a message packet addressed to said destination processor, means for recording operating states of said means for selectively connecting, said means for selectively inserting and said means for selectively removing at successive stages of their operation in the process of routing the message packet from a first processor to a second processor, and means for reestablishing said operating states of said means for selectively connecting, said means for selectively inserting, and said means for selectively removing in a sequence that is the reverse of that used to route the message packet from the first processor to the second processor, whereby a message packet can be routed from said second processor back to said first processor.

2. The apparatus of claim 1 further comprising means for combining a plurality of message packets that are addressed to the same processor.

3. The apparatus of claim 2 further comprising at least:

means for recording the operating states of the combining means at successive stages of the process of routing a message packet from a first processor to a second processor and means for reestablishing the operating states of the combiner in a sequence which is the reverse of that used to combine said plurality of message packets whereby a message packet from said second processor can be duplicated.

4. The apparatus of claim 1 wherein said memory comprises a plurality of channels which flow through said means for selectively connecting, said means for selectively inserting, and said means for selectively removing and said means for selectively connecting comprises, for each channel and each dimension of a network, apparatus for examining address information in said message packet and for inserting said message packet onto a communication line associated with a dimension of the network to which it is addressed.

5. The apparatus of claim 1 wherein said memory comprises a plurality of channels which flow through said means for selectively connecting, said means for selectively inserting, and said means for selectively removing, and said means for selectively inserting comprises for at least one channel and for all processors located at said node a switching means for inserting a message packet from a processor onto said channel, and said means for selectively removing comprises for at least one channel and all processors located at said node means for removing from said channel a message packet addressed to said processor.

6. A parallel computer comprising:

a plurality of integrated circuits each comprising at least one processor, an N-dimensional network interconnecting the integrated circuits having in each of N dimensions communication lines over which the processors communicate with one another, N being equal to or greater than two, and means for routing addressed message packets across said communication lines between a first processor to a second processor comprising at each of a plurality of said integrated circuits in said network:

a memory for storing message packets enroute from a source processor to a destination processor, means for selectively connecting a message packet to a communication line that is connected to an integrated circuit between said source and said destination processors, said connection being made in response to address information in said message packet, means for selectively inserting into a queue at a source processor a message packet addressed for routing to a destination processor, means for selectively removing from a memory at a node at a destination processor a message packet addressed to said destination processor, means for recording operating states of said means for selectively connecting, said means for selectively inserting and said means for selectively removing at successive stages of their operation in the process of routing the message packet from a first processor to a second processor, and means for reestablishing said operating states of said means for selectively connecting, said means for selectively inserting, and said means for selectively removing in a sequence that is the reverse of that used to route the message packet from the first processor to the second processor, whereby a message packet can be routed from said second processor back to said first processor.

7. The apparatus of claim 6 further comprising at each node means for combining a plurality of message packets that are addressed to the same processor.

8. The apparatus of claim 6 further comprising:

means for recording operating states of the combining means at successive stages of the process of routing a message packet from a first processor to a second processor and means for reestablishing operating states of the combiner in a sequence which is the reverse of that used to combine said plurality of message packets whereby a message packet from said second processor can be duplicated.

9. The apparatus of claim 6 wherein said memory comprises a plurality of channels which flow through said means for selectively connecting, said means for selectively inserting, and said means for selectively removing and said means for selectively connecting comprises, for each channel and each dimension of a network, apparatus for examining address information in said message packet and for inserting said message packet onto a communication line associated with a dimension of the network to which it is addressed.

10. The apparatus of claim 6 wherein said memory comprises a plurality of channels which flow through said means for selectively connecting, said means for selectively inserting, and said means for selectively removing, and said means for selectively inserting comprises for at least one channel and for all processors located at said node switching a means for inserting a message packet from a processor onto said channel, and said means for selectively removing comprises for at least one channel and all processors located at said node means for removing from said channel a message packet addressed to said processor.

11. In a parallel computer comprising a plurality of processors and an N-dimensional interconnection network having in each of N dimensions communication lines over which the processors communicate with one another, N being equal to or greater than two, a method of routing addressed message packets across said communication lines between a first processor to a second processor comprising the steps of:

storing message packets enroute from a source processor to a destination processor at each of a plurality of nodes in said network, selectively connecting a message packet to a communication line that is connected to a node between said source and said destination processors, said connection being made in response to address information in said message packet, selectively inserting into a queue at a source processor a message packet addressed for routing to a destination processor, selectively removing from a memory at a destination processor a message packet addressed to said destination processor, recording operating states of means for selectively connecting, means for selectively inserting and means for selectively removing message packets at successive stages of their operation in the process of routing the message packet from a first processor to a second processor, and reestablishing said operating states of said means for selectively connecting, said means for selectively inserting, and said means for selectively removing in a sequence that is the reverse of that used to route the message packet from the first processor to the second processor, whereby a message packet can be routed from said second processor back to said first processor.

12. The method of claim 11 further comprising the step of combining a plurality of message packets that are addressed to the same processor.

13. The method of claim 12 further comprising the steps of:

recording operating states of a combining means at successive stages of the process of routing a message packet from a first processor to a second processor and reestablishing operating states of the combiner in a sequence which is the reverse of that used to combine said plurality of message packets whereby a message packet from said second processor can be duplicated.

14. The method of claim 11 wherein the message packets are stored in a plurality of channels and the step of selectively connecting comprises, for each channel and each dimension of a network, examining address information in said message packet and inserting said message packet onto a communication line associated with a dimension of the network to which it is addressed.

15. A method for routing message packets through a network of nodes that are interconnected in a pattern of two or more dimensions comprising the steps of:

generating a message packet that is routed from a first node to a second in said pattern in accordance with address information included in said message packet, said address information comprising as many digits as there are dimensions, each digit providing addressing information for one dimension, examining a digit of the address of said message packet received at a node to determine if the message packet has reached its destination in the dimension associated with that digit, routing said message packet to another node in the same dimension if an examined digit indicates that the message packet has not reached its destination in that dimension and if a connection to such node is available, if said message packet is not routed, examining another digit of the address of said message packet to determine if the message packet has reached its destination in the dimension associated with that digit, recording operating states of means for routing said message packet at successive stages of its operation in the process of routing the message packet from a first node to a second, and reestablishing said operating states of the routing means in a sequence that is the reverse of that used to route the message packet from the first node to the second, whereby a message packet can be routed from said second node back to said first node.

16. A method for routing message packets through a network of nodes that are interconnected in a pattern of two or more dimensions comprising the steps of:

generating a plurality of message packets each of which is routed from a different source node in said pattern to a destination node in accordance with address information included in said message packet, said address information comprising as many digits as there are dimensions, each digit providing addressing information for one dimension, examining at each node a digit of the address of said message packet received at said node to determine if the message packet has reached its destination in the dimension associated with that digit, routing said message packet to another node in the same dimension if an examined digit indicates that the message packet has not reached its destination in that dimension and if a connection to such node is available, if said message packet is not routed, examining another digit of the address of said message packet to determine if the message packet has reached its destination in the dimension associated with that digit, recording at each node operating states of means for routing said message packets at successive stages of its operation in the process of routing the message packet from a source node to a destination node, and reestablishing at each node said operating states of the routing means in a sequence that is the reverse of that used to route the message packet from the source node to the destination node, whereby message packets can be routed from said destination nodes back to said source nodes.

17. A method for routing message packets through a network of nodes that are interconnected in a pattern of two or more dimensions comprising the steps of:

generating a message packet that is routed from a first node to a second node in said pattern in accordance with address information included in said message packet, said address information comprising as many digits as there are dimensions, each digit providing addressing information for one dimension, during a first period of a routing cycle examining a first digit of the address of said message packet at a first node where said digit is then located to determine if the message packet has reached its destination in a first dimension associated with that digit, routing said message packet to another node in the first dimension if an examined digit indicates that the message packet has not reached its destination in that dimension and if a connection to such node is available, during a second period of the same routing cycle, examining a second digit of the address of said message packet at a node where said digit is then located to determine if the message packet has reached its destination in a second dimension associated with that digit, routing said message packet to another node in the second dimension if an examined digit indicates that the message packet has not reached its destination in that dimension and if a connection to such node is available, during additional periods of the same routing cycle, routing the message packet until each digit of address information is examined at a node where said digit is then located, whereby during one routing cycle, the message packet can be routed serially through as many nodes as there are dimensions, recording operating states of means for performing said routing steps at successive stages of its operation in the process of routing the message packet from a first node to a second node, and reestablishing said operating states of the means for performing said routing steps in a sequence that is the reverse of that used to route the message packet from the first node to the second node, whereby a message packet can be routed from said second node back to said first node.

18. A method for routing message packets through a network of nodes that are interconnected in a pattern of two or more dimensions comprising the steps of:

generating a message packet that is routed from a first node to a second node in said pattern in accordance with address information included in said message packet, said address information comprising as many digits as there are dimensions, each digit providing addressing information for one dimension, during successive periods of a routing cycle examining successive digits of the address of said message packet at a node where the digit being examined is then located to determine if the message packet has reached its destination in a dimension associated with that digit, routing said message packet to another node in that dimension if an examined digit indicates that the message packet has not reached its destination in that dimension and if a connection to such node is available, repeating the routing cycle until the message packet has reached the node to which it is addressed, recording operating states of means for routing said message packet at successive stages of its operation in the process of routing the message packet from a first node to a second node, and reestablishing said operating states of the routing means in a sequence that is the reverse of that used to route the message packet from the first node to the second node, whereby a message packet can be routed from said second node back to said first node.

19. Apparatus for routing message packets through a network of nodes that are interconnected in a pattern of two or more dimensions comprising:

means for generating a message packet that is routed from a first node to a second node in said pattern in accordance with address information included in said message packet, said address information comprising as many digits as there are dimensions, each digit providing addressing information for one dimension, means operative during successive periods of a routing cycle for examining successive digits of the address of said message packet at a node where the digit being examined is then located to determine if the message packet has reached its destination in a dimension associated with that digit, and for routing said message packet to another node in that dimension if an examined digit indicates that the message packet has not reached its destination in that dimension and if a connection to such node is available, means for repeating the routing cycle until the message packet has reached the node to which it is addressed, means for recording operating states of said routing means at successive stages of its operation in the process of routing the message packet from a first node to a second node, and means for reestablishing said operating states of the routing means in a sequence that is the reverse of that used to route the message packet from the first node to the second node, whereby a message packet can be routed from said second node back to said first node.

* * * * *

UNITED STATES PATENT AND TRADEMARK OFFICE
CERTIFICATE OF CORRECTION

PATENT NO. : 4,984,235

DATED : January 8, 1991

INVENTOR(S) : W. Daniel Hillis et al

It is certified that error appears in the above-identified patent and that said Letters Patent is hereby corrected as shown below:

On the title page, item [54] lines 1-2, and in col. 1, lines 1-2, please correct the title to read as follows:

--METHOD AND APPARATUS FOR ROUTING MESSAGE PACKETS AND RECORDING THE ROUTING SEQUENCE--.

Signed and Sealed this

Sixth Day of October, 1992

Attest:

DOUGLAS B. COMER

*Attesting Officer*  *Acting Commissioner of Patents and Trademarks*